US010541000B1

(12) United States Patent
Karakotsios et al.

(10) Patent No.: US 10,541,000 B1
(45) Date of Patent: Jan. 21, 2020

(54) USER INPUT-BASED VIDEO SUMMARIZATION

(71) Applicant: Amazon Technologies, Inc., Seattle, WA (US)

(72) Inventors: Kenneth Mark Karakotsios, San Jose, CA (US); Deon Poncini, San Jose, CA (US); Matthew Alan Townsend, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 14/752,735

(22) Filed: Jun. 26, 2015

(51) Int. Cl.
*G11B 27/031* (2006.01)
*H04N 9/79* (2006.01)

(52) U.S. Cl.
CPC ............. *G11B 27/031* (2013.01); *H04N 9/79* (2013.01)

(58) Field of Classification Search
CPC ................................ G11B 27/031; H04N 9/79
USPC ....... 386/230, 239, 241, 248, 278, 291, 296; 725/32, 34, 38, 40, 46, 47, 60, 61; 715/723
See application file for complete search history.

(56) References Cited

U.S. PATENT DOCUMENTS 8,385,663 B2 * 2/2013 Xu .................... G06F 17/30843 382/181
9,286,938 B1 * 3/2016 Tseytlin ................. G11B 27/02
2003/0217091 A1 * 11/2003 Echigo .................... H04L 29/06 718/103
2010/0023863 A1 * 1/2010 Cohen-Martin ....... G06Q 30/02 715/723
2013/0343597 A1 * 12/2013 Kocks ................ G06K 9/00718 382/100
2014/0359656 A1 * 12/2014 Banica ................. H04N 21/812 725/32
2015/0082349 A1 * 3/2015 Ishtiaq ............ H04N 21/23418 725/40
2015/0143239 A1 * 5/2015 Birkbeck .............. G06F 3/0484 715/716
2015/0334472 A1 * 11/2015 Kishore ........... H04N 21/23439 725/32

(Continued)

OTHER PUBLICATIONS

"Meet the V.360," VSN Mobil, retrieved from <<https://www.vsnmobil.com/products/v360>> on Jun. 19, 2015, 1 page.

*Primary Examiner* — Mishawn N. Hunter
(74) *Attorney, Agent, or Firm* — Lee & Hayes, P.C.

(57) ABSTRACT

One or more frames of video data may depict content that is determined to likely be of interest to a user. A video segment that includes the one or more frames may be determined. Based at least partly on one or more first summarization parameters associated with the user, a first video summarization may be generated, where the first video summarization includes the first video segment and possibly other video segments associated with the video data. The first video summarization may be provided to the user. Upon receiving data that is representative of user feedback relating to the first video summarization, one or more second summarization parameters may be determined based at least partly on the data. A second video summarization of the video data may be generated based at least partly on the one or more second summarization parameters. The second video summarization may then be provided to the user.

20 Claims, 8 Drawing Sheets

(56) References Cited

U.S. PATENT DOCUMENTS

| | | | | |
|---|---|---|---|---|
| 2016/0133297 A1 * | 5/2016 | Thornton | .............. | G11B 27/06 386/230 |

* cited by examiner

USER INPUT-BASED VIDEO SUMMARIZATION

BACKGROUND

Video summarization relates to the process of reducing a video into shorter segments to create a summary of the video that retains portions of the original video. A television show or movie, for example, often are edited versions of hours of raw data. However, the systems used to create many of today's movies and television shows require advanced knowledge by expert users. This leads to the possibility of new technology enabling novel systems and techniques for generating video summarizations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
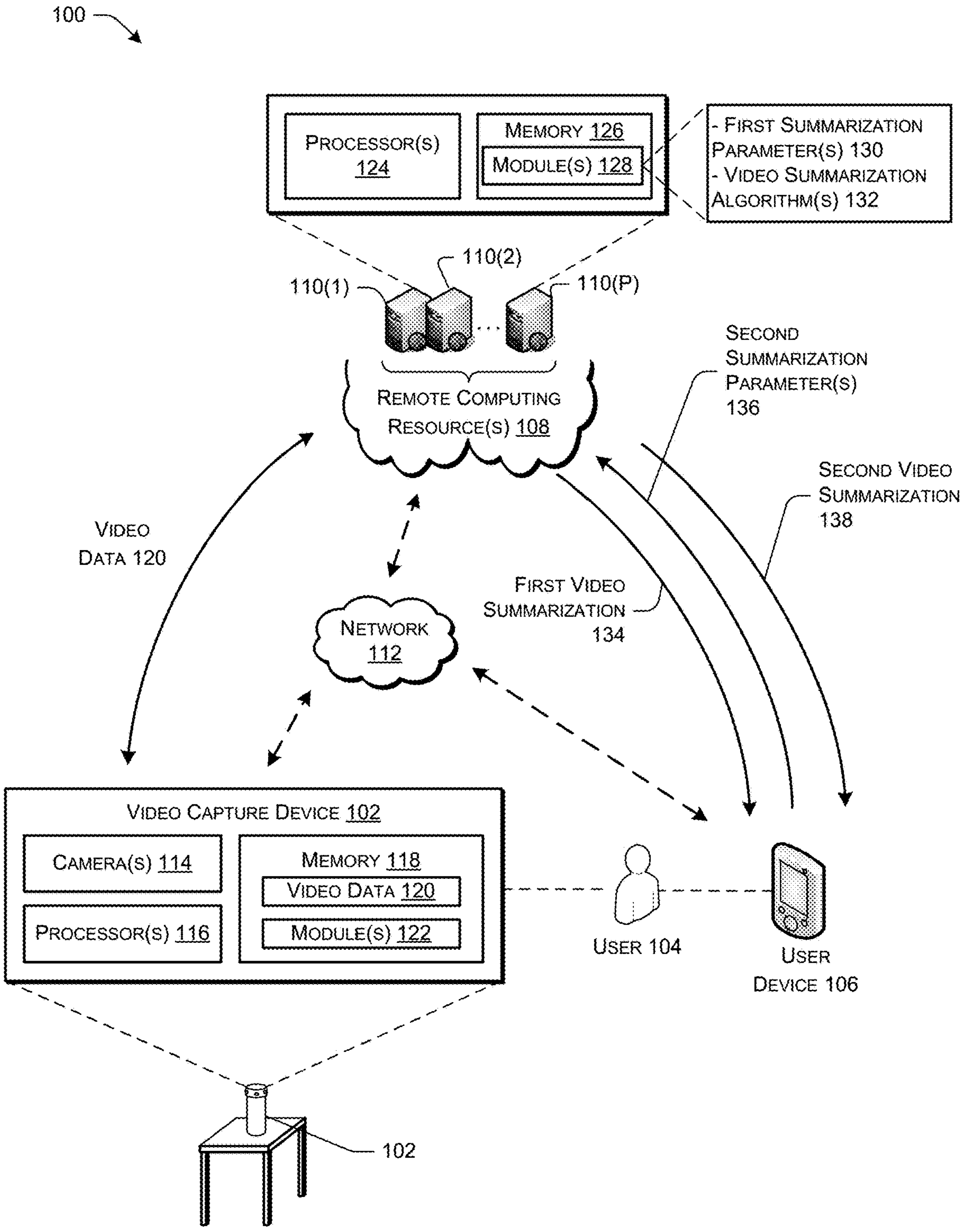
FIG. 1 illustrates an example system for generating one or more video summarizations from video data based on user video summarization parameters.

The systems and/or processes described herein may generate one or more video summarizations from video data captured by one or more cameras of a video capture device, where the video summarizations are generated based on one or more video summarization parameters associated with a user that is to receive the video summarizations. More particularly, the systems and/or processes described herein can be used with a video capture device having one or multiple cameras (e.g., four cameras) that each simultaneously (or nearly simultaneously) capture video data of the surrounding environment. As a result, provided that the video capture device includes multiple cameras, each of the multiple cameras of the video capture device described herein may simultaneously capture video data corresponding to multiple, different fields of view. Accordingly, provided that the video capture device included four different cameras that each capture video data, the video capture device may be configured to capture up to a 360° video and/or a 360° image.

Of course, other devices are capable of capturing up to a 360° video and/or a 360° image and can be used with the systems and methods describe herein. For example, other imaging systems may rely upon rotating a camera to capture an image or video that has a field of view that is larger than the imaging sensor can capture if stationary. Other such examples include imaging systems that rely on a light redirecting device to reflect or redirect light on to an imaging sensor, such as mirrors, prisms, fiber optics, or other suitable device that allows an imaging sensor to capture an image or video that has a field of view that is larger than what the imaging sensor can capture without the light redirecting device.

Upon the camera(s) capturing the video data, the video data may be sent to one or more remote computing resources for further processing. Such processing may include generating one or more video summarizations from the video data. More particularly, the video summarizations may be generated pursuant to one or more summarization parameters that may be default parameters, explicitly provided by a user, or inferred based on information associated with, and/or behavior exhibited by, the user. Examples of such summarization parameters may include length (e.g., an overall length of the video summarization), pace (e.g., lengths of the video segments that make up the video summarization), entropy (e.g., variation in the video summarization or the associated video segments, such as variation in pace, content, camera angle, an accompanying soundtrack, etc.), and technique/style (e.g., a technique or style of a particular director, film, etc.). Therefore, the video summarization may vary based on the particular summarization parameters that are used to generate the video summarization.

The remote computing resources may utilize one or more algorithms (e.g., computer vision algorithms) to identify frames of the video data that will be included within the multipole video segments that constitute the video summarization. For instance, the remote computing resources may apply the algorithms to the video data to identify frames of the video data that are likely to be of interest of the user. Such algorithms may include human detection algorithms to detect and/or identify persons depicted in the frames, object detection algorithms to detect and/or identify objects depicted in the frames, scene detection algorithms to detect and/or identify scenes/landscapes (e.g., a beach scene, mountains, an urban landscape, etc.) depicted in the frames. Accordingly, the remote computing resources may identify frames of the video data that are likely to be of interest to the user, and then generate the video segments from those frames, where the video segments will comprise the resulting video summarization.

The generated video summarization may be provided to or otherwise consumed using a user device (e.g., a mobile telephone, a tablet device, laptop computer, desktop computer, television, etc.) associated with the user via any communication channel (e.g., an e-mail message, a website, a text message, an application residing on the user device, etc.). In some embodiments, the user may provide feedback regarding the video summarization, such as providing feedback relating to an entirety of the video summarization, specific video segments included in the video summarization, and/or summarization parameters used to generate the video summarization. The feedback provided by the user may be constitute additional summarization parameters that may be used to re-summarize the original video data. That is, the user device associated with the user may receive input relating to a video summarization and generate data representing the user feedback. This data may then be sent/transmitted from the user device to the remote computing resources. In particular, the remote computing resources may generate an additional video summarization based on the additional summarization parameters, where the additional video summarization may include video segments from different frames of the video data, and/or may include variations in the initial summarization parameters (e.g., length, pace, entropy, technique/style, etc.). The additional video summarization may then be sent to the user device associated with the user.

In certain embodiments, the data that is generated by the user device and that represents user feedback may be used to summarize and/or res-summarize video data to generate video summarizations at a subsequent time. For instance, the data representing the user feedback may be used to improve (e.g., modify, adjust, etc.) the algorithms used to generate video summarization generally, and/or may be used to customize video summarizations that are subsequently generated for the user.

The systems and techniques described herein may be implemented in a number of ways. Example implementations are provided below with reference to the accompanying figures.

FIG. 1 illustrates an example system 100 that is configured to generate one or more video summarizations from video data based on one or more summarization parameters. In various embodiments, the video data may be captured by one or more cameras of a video capture device 102 (interchangeably referred to as "device"). The video capture device 102 may be included in an environment, such as a home environment, as illustrated in FIG. 1, or in any other environment (e.g., an outdoors environment). The video capture device 102 may be placed in a fixed location within the environment, such as on a table, or may be carried by a user 104. For the purposes of this discussion the size of the video capture device 102 illustrated in FIG. 1 is not necessarily representative of its actual physical size. In various embodiments, the user 104 may have one or more other user devices 106, which may be used to perform various operations. Here, the user device 106 may be utilized by the user 104 to receive and view video summarizations generated from video data and to provide summarization parameters and/or data representing user feedback that are used to generate the video summarizations. In addition to the video capture device 102, the system 100 may include one or more remote computing resource(s) 108, which may be implemented as one or more servers 110(1), 110(2), . . . , 110(P), and one or more networks 112.

As illustrated in FIG. 1, the video-capture device 102 may include at least one or more cameras 114, one or more processors 116, and memory 118. The memory 118 may store video data 120 captured by the camera(s) 114 and one or more modules 122 that perform various operations. In various embodiments, each of the cameras 114 of the video capture device 102 may capture video data 120, such as a stream of video, as well as still images. For instance, provided that the video-capture device 102 included four different cameras 114, each of the four cameras 114 may capture a different video stream corresponding to a field of view. The cameras 114 may be positioned on each side of the video capture device 102, such that each camera 114 is positioned 90° with respect to its adjacent cameras 114 (e.g., cameras 114 to the left and the right). That is, a first axis in which a first camera 114 is oriented may be approximately 90° from a second axis in which adjacent cameras 114 are oriented. Since the field of view of a first camera 114 may overlap with the field of views of adjacent cameras 114, the multiple cameras 114 of the video capture device 102 may capture 360° of video, which will be discussed in additional detail with respect to FIG. 2. Moreover, instead of the video capture device 102 including multiple cameras 114, the video capture device 102 may capture 360° video using a single camera 114 that rotates about the video capture device 102 at a high rate/speed.

The cameras 114 of the video capture device 102 may capture video data 120 of the environment surrounding the video capture device 102. The video capture device 102 may be set on a surface within an environment, which may allow the multiple cameras 114 to capture video of the environment. For instance, the video capture device 102 may be set on a table within a room of a home to capture video of activity (e.g., a birthday party) taking place within the room. Due to multiple cameras 114 simultaneously capturing video, the video capture device 102 may capture video in multiple different directions, thereby capturing video of an entirety of the events taking place within the room, provided that those events are within the field of view of at least one of the cameras 114. The video capture device 102 may also be held by the user 104, or may be affixed the user 104 in some manner (e.g., via a strap, a clip, a platform, etc.). Accordingly, as the user 104 moves within an environment (e.g., a room, the beach, a hike in the mountains, etc.), the video capture device 102 may capture video of events occurring within that environment. The cameras 114 may continuously capture video, or may begin/cease capturing video in response to user input (e.g., user actuation of a button, a voice command, etc.).

As stated above, the video data 120 may represent video captured by each of the multiple cameras 114 of the video capture device 102. The one or more modules 122 of the video capture device 102 may include software and/or other functionality that may stitch together the video data 120 captured by the multiple cameras 114. That is, provided that the video data 120 is captured by four different cameras 114, the modules 122 may stitch video data 120 captured by a first camera 114 with the video data 120 captured by cameras 114 adjacent to the first video camera 114. As a result, stitching of the video data 120 may result in stitched video data, where the stitched video data is 360° video that depicts the environment surrounding the video capture device 102. The stitching of the video data 120 may also be performed by the remote computing resources 108, or by a combination of the video capture device 102 and the remote computing resources 108, and is discussed in additional detail with respect to FIG. 2. However, in other embodiments, the video data 120 may not be generated as a result of stitching multiple video streams.

The modules 122 may also include speech recognition software or other speech recognition functionality. The video capture device 102 may include one or more microphones that detect voice commands uttered by the user 104 and that generate one or more audio signals corresponding to the voice commands. The speech recognition software may process the audio signals to recognize words included within the voice command. As a result, the video capture device 102 may recognize voice commands uttered by the user 104 (e.g., start recording video, stop recording video, take a photograph, etc.) and perform corresponding operations as a result (e.g., instruct the cameras 114 to record video, instruct the cameras 114 to cease recording video, instruct the cameras 114 to capture a still image, etc.). The video capture device 102 may include one or more user interfaces (e.g., graphical user interfaces) and/or one or more speakers that allow the video capture device to visually and/or audibly output information to the user 104, which may allow the user 104 to interact with the video capture device 102. The video capture device 102 may also allow the user 104 to input various types of information that are used to capture/generate the video data 120.

In some instances, the video capture device 102 may operate in conjunction with or may otherwise utilize computing resources that are remote from the video capture device 102 (i.e., the remote computing resources 108). For instance, the video capture device 102 may couple to the remote computing resources 108 over the network 112. As illustrated, and as set forth above, the remote computing resources 108 may be implemented as one or more servers 110(1), 110(2), . . . , 110(P) and may, in some instances, form a portion of a network-accessible computing platform implemented as a computing infrastructure of processors 124, storage (e.g., memory 126), software (e.g., modules 128), data access, and so forth that is maintained and accessible via the network 112, such as the Internet. The remote computing resources 108 may not require end-user knowledge of the physical location and configuration of the system that delivers the services. Common expressions associated for these remote computing resources 108 may include "on-demand computing", "software as a service (SaaS)", "platform computing", "network-accessible platform", "cloud services", "data centers", and so forth.

The servers 110(1)-(P) may include the processor(s) 124 and the memory 126, which may include one or more modules 128 and which may store or otherwise have access to some or all of the components described with reference to the memory 118 of the video capture device 102. For instance, the memory 126 may have access to and utilize the modules 122 that perform video stitching and/or speech recognition operations. In some examples, the video capture device 102 may upload the video data 120 to the remote computing resources 108 for processing, given that the remote computing resources 108 may have a computational capacity that exceeds the computational capacity of the video capture device 102. Therefore, the video capture device 102 may utilize the functionality of the remote computing resources 108 for performing relatively complex analysis on video data 120 captured from the environment.

Alternatively, or in addition to the video capture device 102 stitching the video data 120 to generate the stitched video data, the video capture device 102 may transmit the raw video data 120 captured by the multiple cameras 114 to the remote computing resources 108. The remote computing resources 108 may then process the raw video data and/or stitch together the video data to generate stitched video data.

The video capture device 102, the user device 106, and/or the remote computing resources 108 may communicatively couple to the network 112 via wired technologies (e.g., wires, USB, fiber optic cable, etc.), wireless technologies (e.g., RF, cellular, satellite, Bluetooth, etc.), or other connection technologies. The network 112 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Regardless of whether the video stitching occurs, whether the video stitching occurs locally on the video capture device 102 and the stitched video data is transmitted to the remote computing resources 108, or whether the video stitching is performed remotely from the video capture device 102 (e.g., the video data 120 is sent to the remote computing resources 108 via the network 112 for stitching), the remote computing resources 108 may further process the video data 120.

More particularly, the remote computing resources 108, and in particular, the one or more modules 130, may apply, run, and/or execute one or more algorithms or classifiers with respect to the video data 120 to determine the content depicted in some or all of the frames of the video data 120. In some embodiments, the remote computing resources 108 may annotate the frames of the video data 120 to identify the specific content (e.g., scenes, persons, object, etc.) depicted in each of the frames, and may store the annotations of the frames in a database. For the purpose of this discussion, a frame of the video data 120 may correspond to a set of pixel data (e.g., pixels) at a particular time (e.g., associated with a time stamp), and the frame may depict content within a field of view of a camera from a first time to a second time that is subsequent to the first time. From the processed frames of the video data 120, the remote computing resources 108 may identify one or more candidate frames of the video data 120. The candidate frames may include frames of video that depict content that is determined to likely be of interest to the user 104.

For instance, the algorithms may include computer vision algorithms, such as human detection or object detection algorithms, to identify people (e.g., the user 104 or friends, family, etc., of the user 104) and/or objects (e.g., a house, a ball, etc.) depicted in the frames of the video data 120. The algorithms may also include face detection or smile detection algorithms to identify persons depicted within frames of the video data 120 and whether those persons are smiling. In addition, the algorithms may include scene detection algorithms to determine scenes/landscapes depicted within frames of the video data 120, such as a beach scene, a forest scene, a home environment, and so on. The algorithms may also include background detection algorithms that determine the background depicted within the frames of the video data 120. As a result, the remote computing resources 108 may execute the above algorithms to identify one or more frames that depict content that is likely to be of interest to the user 104. That is, the identified frames of the video data 120 may constitute video segments that are included within a video summarization for the user 104. That is, each video segment may refer to a portion/segment of the video data 120 that is shorter in duration than a total duration of the video data 120 and that includes, or is made up of, one or more of the frames of the video data 120.

In various embodiments, the memory 126 of the remote computing resources 108 may store one or more first summarization parameters 130 and one or more video summarization algorithms 132, which may be used to generate a first video summarization 134. The first summarization parameters 130 may include any type of parameter that is used to generate a video summarization from the video data 120, where the video summarization may represent a summary or a condensed version of the video data 120 that includes multiple video segments that are selected from the video data 120 and that correspond to the previously identified candidate frames of the video data 120. The multiple video segments are then combined to generate the video summarization, which may represent portions of the video data 120 that are determined to depict content (e.g., persons, objects, scenes, events, action, landscapes, etc.) that is most likely to be of interest to the user 104.

The first summarization parameters 130 may constitute input parameters that govern an output (e.g., the first video summarization 134) of the video summarization process. Examples of the first summarization parameters 130 may include overall length (e.g., an overall length of the first video summarization 134), pace (e.g., lengths of the video segments that make up the first video summarization 134), entropy (e.g., variation in the first video summarization 134 or the associated video segments, such as variation in pace, content, camera angle, an accompanying soundtrack, etc.), and technique/style (e.g., a technique or style of a particular director, film, etc.). The video summarization algorithms 132 may use the first summarization parameters 130 to generate the first video summarization 134 from the candidate frames of the video data 120.

The first summarization parameters 130 may be default parameters that the remote computing resources 108 use to generate video summarizations from video data 120. In particular, the remote computing resources 108 may generate the first video summarization 134 using one or more algorithms, and possibly without first receiving input from the user 104. The one or more algorithms may facilitate generation of the first video summarization 134 based on the video data 120 itself (e.g., content depicted in the video data 120) and/or a type of the content depicted in the video data 120 (e.g., a wedding scene, an outdoor scene, etc.). The video summarization may also be generated based on video summarization preferences determined from previously generated video summarizations, data that represents user feedback relating to those video summarizations, user data associated with a user account (e.g., search history, browse history, purchase history, etc.), and so on. After providing the first video summarization 134, the user 104 may have the option of tuning, refining, adjusting, etc., the first summarization parameters 130 that were used to generate the first video summarization 134. Therefore, the first video summarization 134 may be a default video summarization generated from the video data 120, or may be based on information relating to a user 104/user account, and then the user 104 may provide input regarding modification of the first video summarization 134. In other embodiments, the remote computing resources 108 may provide to the user 104 multiple, different video summarizations from the video data 120 (e.g., having variations in length, music, directorial style, etc.), and the user 104 may decide which video summarization he/she prefers.

Alternatively, the first summarization parameters 130 may be provided by the user 104 that is requesting that the first video summarization 134 be generated. For instance, regarding the first video summarization 134, the user 104 may indicate a particular style/technique, an overall length, lengths of the video segments, filters to be used, a soundtrack associated with the first video summarization 134, the presence and/or type of dialogue, color, and so on. That is, the user 104 may provide input that dictates how the first video summarization 134 is to be generated. In other embodiments, the first summarization parameters 134 may be determined based on a user profile associated with the user 104, or may be inferred based on interests/preferences of the user 104 and/or prior behavior exhibited by the user 104 (e.g., prior video summarizations, data representing prior user feedback provided by user devices 106, movies watched or purchased, etc.).

Upon generating the first video summarization 134, the first video summarization 134 may be sent to the user device 106, which may include any type of user device 106 (e.g., a mobile telephone, a laptop computer, a tablet device, the video capture device 102, etc.), associated with the user 104. The first video summarization 134 may be sent via a website, an application residing on the user device 106, an e-mail message, a text message, and so on. The user 104 may view the first video summarization 134 and provide input via his/her user device 106 (e.g., via an application associated with the video capture device 102 and/or the remote computing resources 108), which will then generate data that represents user feedback relating to the video summarization 134. The user device 106 may send the data to the remote computing resources 134. In FIG. 1, the data representing the user feedback may be represented as second summarization parameters 136. In various embodiments, the second summarization parameters 136 may be used to generate a second video summarization 138 of the video data 120 that is to be provided to the user 104.

More particularly, the user 104, via his/her user device 106, may provide input indicating whether he/she liked/disliked the first video summarization 134, whether the user 104 would like modifications to the first video summarization 134, and/or whether the user 104 would like the remote computing resources 108 to re-summarize the video data 120 to generate a new video summarization (i.e., the second video summarization 138). The user device 106 associated with the user 106 may generate data from the input, where the data may represent user feedback relating to the first video summarization 134 and may be sent to the remote computing resources 108. As a result, the remote computing resources 108 may utilize the second summarization parameters 136 to generate the second video summarization 138. As compared to the first video summarization 134, the second video summarization 138 may include different video segments from the video data 120 (e.g., video segments based on different frames, longer/shorter video segments, more/fewer video segments, etc.). The second video summarization 138 may also include modifications to the same video segments included in the first video summarization 134, such as differences in dialogue, color, audio (e.g., music), etc. Upon the user 104 receiving the second video summarization 138, the user 104 may elect to provide additional input via his/her user device 106, which may cause the user device 106 to generate data representative of user feedback and send the data to the remote computing resources 108, which may cause the remote computing resources 108 to re-summarize the video data 120 to generate an additional video summarization.

Accordingly, the video summarization process performed by the remote computing resources 108 may include multiple different steps. For example, the remote computing resources 108 may first identify frames of video data 120 that depict content that is likely to be of interest to the user 104. Then, the remote computing resources 108 may perform an iterative process to generate video summarizations of the video data 120 for the user 104. Based on initial input (i.e., the first summarization parameters 130), the remote computing resources 108 may generate and deliver a first video summarization 134. In response to receiving data representative of user feedback relating to the first video summarization 134, the remote computing resources 108 may then re-summarize the video data 120 to generate the second video summarization 138 that is consistent with the preferences of the user 104. Moreover, for the purposes of this discussion, the operations/functions performed by the remote computing resources 108 may also be performed by the video capture device 102, and vice versa.

Figure 2:
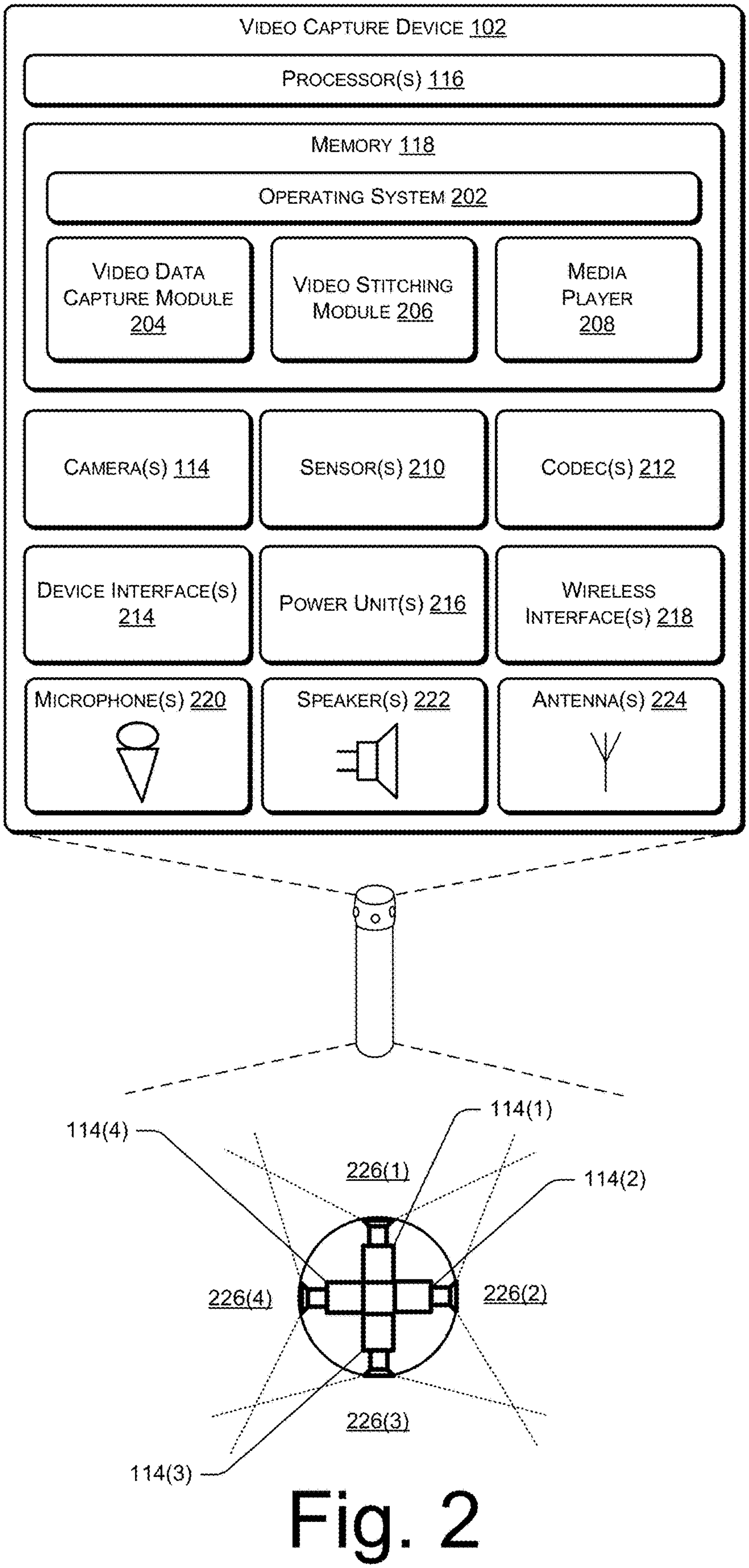
FIG. 2 illustrates an example device that includes multiple cameras configured to capture video data in which video summarizations can be generated.

FIG. 2 shows selected functional components and/or modules of one implementation of the video capture device 102 in additional detail. Generally, the video capture device 102 may be implemented as a standalone device that may be relatively simple or complex in terms of functional capabilities with input/output components, memory, and processing capabilities. For instance, the video capture device 102 may or may not have a keyboard, keypad, or other form of mechanical input in some implementations. The video capture device 102 may or may not have a display or touch screen to facilitate visual presentation and user touch input. Moreover, the video capture device 102 may be implemented with the ability to receive and output audio, video, and/or visual data, a network interface (wireless or wire-based), power, and processing/memory capabilities. As set forth above with respect to FIG. 1, the video capture device 102 may include one or more cameras 114 that capture video data 120 from which one or more video summarizations are generated.

In the illustrated implementation, the video capture device 102 may include the processor(s) 116 and the memory 118. In various embodiments, the processor(s) 116 may execute one or more modules and/or processes to cause the video capture device 102 to perform a variety of functions, as set forth above and explained in further detail in the following disclosure. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems. The processor 116 may include multiple processors 116 and/or a single processor 116 having multiple cores.

The memory 118 may include computer-readable storage media ("CRSM"), which may be any available physical media accessible by the processor(s) 116 to execute instructions stored on the memory 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 116. As will be discussed in additional detail, the memory 118 may include an operating system 202, one or more modules 122, such as a video capture module 204 and a video stitching module 206, and a media player 208.

In addition to the processor(s) 116 and the memory 118, the video capture device 102 may include one or more multiple cameras 114. For instance, as described in additional detail below, the video capture device 102 may include four cameras 114 that are positioned on/within the video capture device 102 90° from one another. Each of the multiple cameras 114 may capture video data 120, such as a video stream, within its corresponding field of view. As a result, by the four cameras 114 simultaneously capturing video, the video capture device 102 may capture 360° of video surrounding the video capture device 102. For the purposes of this discussion, the cameras 114 may include any type of camera 114 (e.g., high definition (HD) camera) that is capable of capturing video and/or images (e.g., still images, panoramic images, etc.). Additionally, while this disclosure primarily discusses embodiments utilizing four cameras 114, it should be appreciated that some embodiments can utilize fewer (e.g., 1, 2, or 3) or more (e.g., 5, 6, 8, 10, and so on) cameras 114.

The video capture device 102 may also include one or more sensors 210, codecs 212, device interfaces 214, power units 216, wireless interfaces 218, microphones 220, speakers 222, and antennas 224. For instance, the sensors 210 may include a motion detector to determine/measure the motion and/or the velocity of motion (e.g., speed, rate, etc.) of the video capture device 102, a location sensor (e.g., GPS sensor) to determine the position/physical location of the video capture device 102, an accelerometer to determine the acceleration of movement of the video capture device 102, an inertial measurement unit (IMU) to determine the velocity and orientation of the video capture device, a gyroscope to determine or maintain the orientation of the video capture device 102, an altimeter/altitude meter to determine the altitude of the video capture device 102, a compass to determine the orientation/direction of the video capture device 102, and/or any other type of sensor 210 utilized to determine the motion, velocity, acceleration, orientation, tilt, etc., of the video capture device 102.

In addition, the video capture device 102 may include one or more codecs 212 that are coupled to the microphone(s) 220 and/or the speaker(s) 222 to encode and/or decode audio signals generated by the microphone(s) 220. The codec(s) 212 may convert audio data and/or video data between different formats.

One or more device interfaces 214 (e.g., USB, broadband connection, etc.) may further be provided as part of the video capture device 102 to facilitate a wired connection to a network, such as network 112, or a plug-in network device that communicates with other wireless networks. Moreover, one or more power units 216 may further be provided to distribute power to the various components of the video capture device 102. The power unit(s) 216 may include hardware that enables the video capture device 102 to be plugged into an outlet, thereby providing power to the video capture device 102. Alternatively, or in addition, the power unit(s) 216 may correspond to one or more batteries (rechargeable or not) that may provide power to the video capture device 102. Provided that the video capture device 102 includes one or more batteries, the video capture device 102 may be carried and used by the user 104 while he/she moves between different locations.

In the illustrated example, the video capture device 102 may include one or more wireless interfaces 218 coupled to one or more antennas 224 to facilitate a wireless connection to a network (e.g., network 112). The wireless interface 218 may implement one or more of various wireless technologies, such as Wi-Fi, Bluetooth, radio frequency (RF), and so on.

The video capture device 102 may include a microphone unit that comprises one or more microphones 220 to receive audio input. The microphone(s) 220 of the video capture device 102 may detect audio data from the environment 102, such as sounds uttered by the user 104 and/or other ambient noise within the environment (e.g., birds chirping, waves crashing, voices, etc.). The microphones 220 may further generate audio signals that are representative of the audio data captured by the microphone(s) 220. In some embodiments, the microphone(s) 220 of the video capture device 102 may detect audio commands uttered by the user 104, which may include audible instructions for the video capture device 102 to power on, begin recording video, stop recording video, and so on. The video capture device 102 may also include a speaker unit that includes one or more speakers 222 to output audio sounds. Such audio sounds may be responsive to the audio commands uttered by the user 104, or may provide various types of information to the user 104.

Therefore, the user 104 of the video capture device 102 may interact with the video capture device 102 by speaking to it, and the microphone(s) 220 may capture sound and generate an audio signal that includes the user speech. The codec(s) 212 may encode the user speech and transfer that audio data to other components. The video capture device 102 can communicate back to the user 104 by emitting audible statements through the speaker(s) 222. In this manner, the user 104 may interact with the video capture device 102 simply through speech, without use of a keyboard or display common to other types of devices.

However, the video capture device 102 may include other user interface (UI) components that enable user interaction with the video capture device 102. For instance, the video capture device 102 may include haptic input devices, such as navigation buttons, keypads, joysticks, keyboards, touch screens, and the like. Furthermore, the video capture device 102 may include a display for text, graphical, or other visual output. The video capture device 102 may also include non-input control mechanisms, such as basic volume control button(s) for increasing/decreasing volume, buttons to cause the cameras 114 of the video capture device 102 to start and stop recording video data 120, buttons to adjust parameters (e.g., resolution, zoom, etc.) associated with the cameras 114, as well as power and reset buttons. There may also be one or more simple light elements (e.g., LEDs around perimeter of a top portion of the device 106) to indicate a state such as, for example, when power is on or to indicate that the video capture device 102 is currently capturing video of the surrounding environment. Though, in some instances, the video capture device 102 may not use or need to use any input devices or displays in some instances.

In various embodiments, the memory 118 of the video capture device 102 may include the operating system 202. In some instances, the operating system 202 may be configured to manage hardware and services (e.g., device interface(s) 214, wireless interface(s) 218, codec(s) 212, etc.) within, and coupled to, the video capture device 102 for the benefit of other modules. Moreover, the media player 208 may function to output any type of content on any type of output component of the video capture device 102. For instance, the media player 208 may output audio via the speaker(s) 222 and/or video or other visual information via a display of the video capture device 102. For instance, the user 104 may interact (e.g., audibly, via other user input, etc.) with the video capture device 102 to instruct the media player 208 to cause output of audio (e.g., audio of a video), and/or a video or an image captured by the camera(s) 114.

In addition, the memory 118 may include the video capture module 204 and the video stitching module 206. Also, some or all of the components, modules, hardware, etc., may reside additionally or alternatively at the remote computing resources 108. In various embodiments, the video data capture module 204 may cause the multiple cameras 114 of the video capture device 102 to capture video data 120 of the surrounding environment. That is, assume that the video capture device 102 includes four different cameras 114—a first camera 114, a second camera 114, a third camera 114, and a fourth camera 114. The video data capture module 204, may cause the first camera 114 capture first video data 120, the second camera 114 to capture second video data 120, the third camera 114 to capture third video data 120, and the fourth camera 114 to capture fourth video data 120. As a result, the video capture device 102 may capture four, and possibly more, video streams simultaneously.

Due to the multiple cameras 114 of the video capture device 102 having overlapping fields of view, the video stitching module 206 may stitch together the video data 120 captured by the cameras 114 to generate the stitched video data 124, where the stitched video data corresponds to 360° video. In various embodiments, the video capture device 102 may transmit the raw video data 120 captured by the cameras 114 to the remote computing resources 108, which may then stitch the video data 120. However, the video stitching module 106 residing on the video capture device 102 may first stitch together the video data 120 and then transmit the stitched video data to the remote computing resources 108 for additional processing.

The video stitching module 206 may stitch the individual video streams such that video streams corresponding to a first camera 114 are stitched to video streams corresponding to the two cameras 114 that are adjacent to the first camera 114. Each video stream, or even each frame within the video stream, may have metadata that includes various types of information about the video stream/frame. For instance, the metadata may indicate the specific camera 114 that captured the video stream. In addition, each frame of the video stream may include a time stamp indicating a time in which the frame was captured. As a result, the video stitching module 206 may stitch together the appropriate video streams (e.g., video streams from cameras 114 adjacent to one another). The video stitching module 206 may also be able to stitch together the appropriate frames of the video streams to one another, such that frames having the same time stamps are stitched to one another.

For the purposes of this discussion, video stitching may correspond to the process of combining multiple video streams having overlapping fields of view to produce a single video stream. The video stitching module 206 may utilize various types of video stitching software and/or video stitching algorithms to stitch the video streams to one another. In various embodiments, the independent video streams may be of varying quality, color, lighting, contrast, etc., and may not require exact overlap in order to be stitched. Upon stitching the video streams to each other, any seams between the video streams of the stitched video (i.e., stitched video data 124) may not be apparent, or at least may be minimal. However, in other embodiments, 360° video may be captured and/or generated without stitching together multiple video streams captured by multiple cameras 114.

FIG. 2 further illustrates the video capture device 102 having four different cameras 114—a first camera 114(1), a second camera 114(2), a third camera 114(3), and a fourth camera 114(4). In various embodiments, the four cameras 114 are positioned on the video capture device 102 such that they are 90°, or approximately 90°, from one another. For instance, the first camera 114(1) and the third camera 114(3) may be associated with a first axis that is 90° from a second axis associated with the second camera 114(2) and the fourth camera 114(4). As a result, each of the four cameras 114 captures video in a different direction.

In addition, each of the four cameras 114 has a corresponding field of view 226. The field of view 226 for a particular camera 114 may correspond the portion of the environment surrounding the video capture device 102 that is visible to that camera 114 when the camera 114 is positioned at a particular position and orientation. First objects within the field of view 226 of a camera 114 may be depicted within video captured by that camera 114, while second objects outside of that field of view 226 will not be depicted in that video, although such second objects may be included in the field of view 226 of a different camera 114 of the video capture device 102. Moreover, the field of view 226 of a camera 114 of the video capture device 102 may change in response to movement (e.g., vertical movement, horizontal movement, rotation, etc.) of the video capture device 102.

As shown in FIG. 2, each of the cameras 114 may have a corresponding field of view 226, such that the first camera 114 has a first field of view 226(1), the second camera 114(2) has a second field of view 226(2), the third camera 114(3) has a third field of view 226(3), and the fourth camera 114(4) has a fourth field of view 226(4). As shown, the field of views 226 of adjacent cameras 114 of the video capture device 102 may overlap. For instance, the field of view 226(1) of the first camera 114(1) overlaps with the second field of view 226(2) of the second camera, and overlaps with the fourth field of view 226(4) of the fourth camera 114(4). Therefore, certain objects included in the first field of view 126(1) of the first camera 114(1) may also be included in the second field of view 126(2) of the second camera 114(2) or in the fourth field of view 126(4) of the fourth camera 114(4), and vice versa. As a result, the cameras 114 of the video capture device 102 are able to capture video in multiple different directions, which allows the stitched video data to represent a 360° video of the environment surrounding the video capture device 102.

Figure 3:
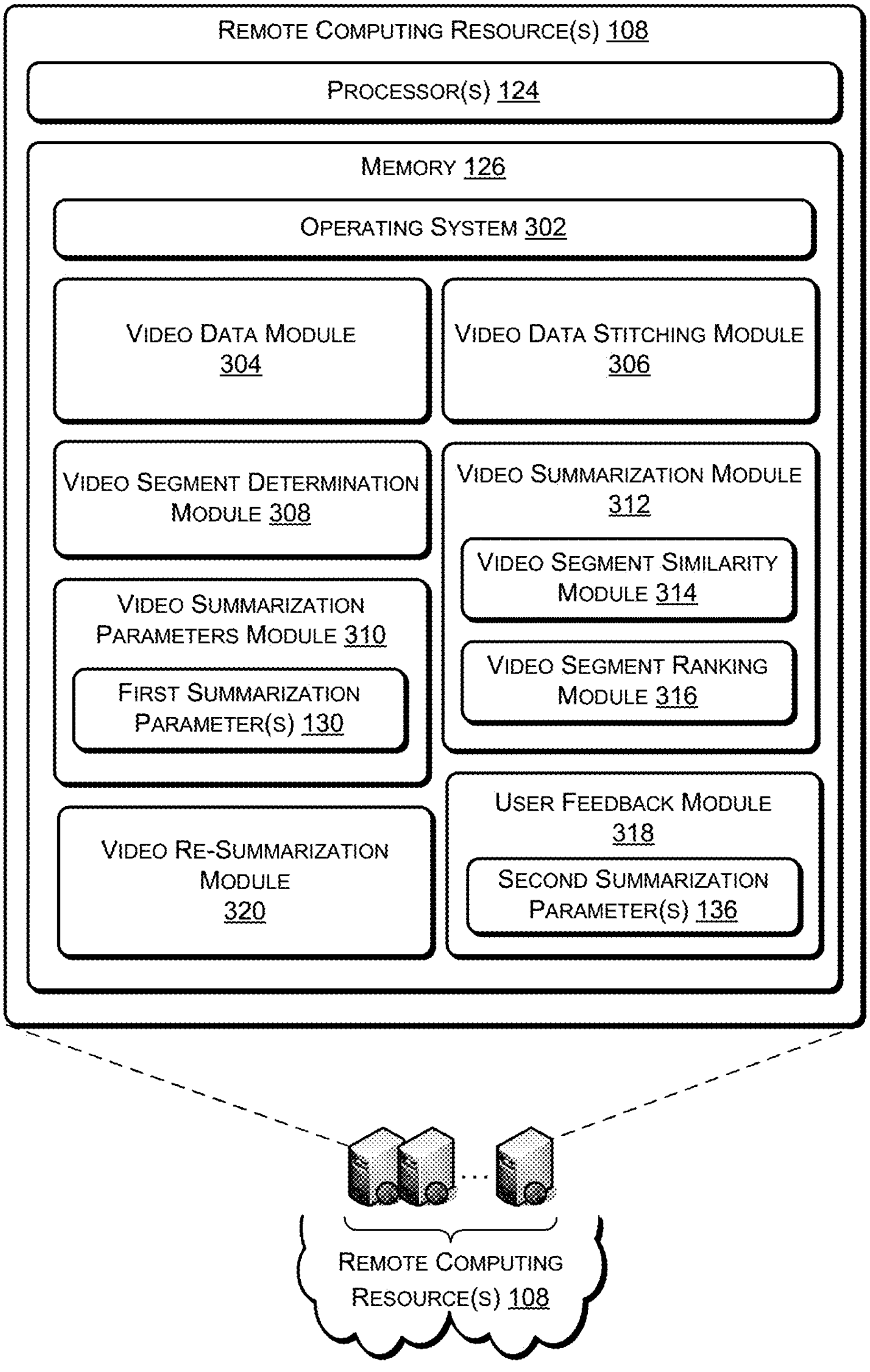
FIG. 3 illustrates an example device that is configured to generate one or more video summarizations based on video summarization parameters associated with a user.

FIG. 3 shows selected functional components and/or modules of one implementation of the remote computing resources 108 in additional detail. As shown, the remote computing resources 108 may include the processor(s) 124 and memory 126, which may include an operating system 302, a video data module 304, a video data stitching module 306, a video segment determination module 308, a video summarization parameters module 310, a video summarization module 312, which may include a video segment similarity module 314 and a video segment ranking module 316, a user feedback module 318, and a video re-summarization module 320. Moreover, the remote computing resources 108 may generate one or more video summarizations from video data 120.

The video data module 304 may receive video data 120, which may or may not be captured by the camera(s) 114 of the video capture device 102. In certain embodiments, the video data 120 may be generated by the remote computing resources 108, or may be received/obtained from another entity or user 104. In other embodiments, the video data module 304 may receive each of the raw video streams captured by each camera 114 of the video capture device 102. In this scenario, the camera(s) 114 of the video capture device 102 may capture frames of video, encode the frames of video, and then send, via the network 112, the encoded frames of video to the remote computing resources 108. Alternatively, the video data module 304 may receive the stitched video data from the video capture device 102. That is, provided that the video data 120 is generated by stitching together different video streams, at least a portion of the stitching of the video data 120 may be performed by the video capture device 102.

Provided that the video capture device 102 provided the video streams to the remote computing resources 108, or only stitched a portion of the video streams, the video data stitching module 306 of the remote computing resources 108 may generate the video data 120 by stitching together the video streams captured by the one or more cameras 114 of the video capture device 102 using the techniques described herein. For instance, the video data stitching module 306 may decode the encoded video streams transmitted by the video capture device 102 and stitch the frames together, thereby generating the stitched video data, which may represent 360° video. The remote computing resources 108 may then perform additional processing on the stitched video data. However, for the purposes of this discussion, any additional processing performed on the video data 120 may be performed without any video data stitching.

The video segment determination module 308 may identify or determine video segments of the video data 120 that are to be included in the video summarization that is to be provided to the user 104. Each video segment of the video data 120 may constitute video having a particular duration of time, where the video segments may have the same or different lengths. Moreover, the video segments may include one or more frames of the video data 120, where each of the frames may have a start time and an end time that determines a length of the frame. For instance, provided that the frame rate for the video data 120 was ten frames per second, each frame of the video data 120 would be 0.1 seconds in duration. As a result, a particular video segment of the video data 120 may include multiple frames of the video data 120. Multiple video segments of the video data 120 may subsequently be combined to generate the video summarization for the video data 120. However, each video segment may be of a duration that is less than the total duration of the video data 120.

In various embodiments, the video segment determination module 308 may determine video segments of the video data 120 that depict content (e.g., persons, object, scenes, action, etc.) that are likely to be of interest to the user 104. That is, since the video summarization may constitute a condensed version or summary of the video data 120, the remote computing resources 108 may attempt to include video segments that depict the most interesting content. To do so, the video segment determination module 308 may identify one or more frames of the video data 120 that depict content that is likely to be of interest to the user 104, and therefore could be included in the video segments that constitute the video summarization. More particularly, the video segment determination module 308 may identify one or more candidate frames of the video data 120 that may be deemed of interest to the user 104 using one or more algorithms and/or classifiers. The remote computing resources 108 may be able to determine which portions of the video data 120 are likely to be of interest to the user 104 based at least partly on specific persons, objects, scenes, etc., that are depicted within those portions. The remote computing resources 108 may also be able to determine which frames of the video data 120 are of better quality, do not contain blurriness, have good color/contrast balance, and so on. Such frames may serve as good candidates to include in the video segments.

In various embodiments, the video segment determination module 308 may utilize one or more algorithms (e.g., audio-based algorithms, computer vision algorithms, etc.) to determine frames in the video data 120 that have a requisite degree of interest. Using these algorithms, the video segment determination module 308 may assign varying interest levels (e.g., varying numerical values) to regions of interest (i.e., frames) in the video data 120. Frames within the video data 120 having a higher interest level/value may be those frames that include people, frames that depict individuals smiling towards the location in which the video was captured, frames that depict various scenes (e.g., a room of a house, a beach, mountains, etc.), and so on. The algorithms may be applied to the video data 120 (e.g., the video data 120 may be considered an input for the algorithms) and the output of the algorithms may indicate an interest level/value of different frames of the video data 120. That is, the algorithms may output weights for the frames, where the weights may correspond to a likelihood that the frame depicts content that is to be of interest to the user 104, as compared to other frames of the video data 120.

The algorithms may include one or more object detection, recognition, and/or identification algorithms that may detect, recognize, and/or identify objects depicted within various frames of the video data 120. Such objects may include people, a building, a landmark, and so on. Object detection algorithms may identify certain objects that are known to be of interest to, or at least are likely to be of interest to, the user 104. The algorithms may also include human detection algorithms that determine whether a person is depicted within a particular frame. Human detection algorithms may determine whether friends, family members, co-workers, etc., are depicted within frames of the video data 120. Face detection algorithms may be configured to detect faces depicted within frames, and may also be able to determine whether the faces are directed towards the camera 114, to determine whether the eyes of individuals are open/closed, and to identify the identity of the person. In addition, smile detection algorithms may be able to determine whether individuals depicted within frames of the video data 120 are in fact smiling, and whether those individuals are smiling towards the camera 114 that captured the video/image.

The algorithms may also include one or more scene detection algorithms that are configured to detect a scene or landscape depicted within frames of the video data 120. For instance, the scene detection algorithms may determine whether frames of the video data 120 depict a home setting, a beach setting, a mountain setting, a city setting, a lake setting, and so on. The scene detection algorithms may identify individual pixels in the frames and classify the pixels differently, such as by classifying some pixels as sky, others as water, others as beach, others as grass, and so on. By identifying different scenes depicted within the frames, the video segment determination module 308 may identify settings or scenes that are likely to be of interest to the user 104 (e.g., the beach, a mountain range, etc.), while identifying other settings or scenes that likely would not be of interest to the user 104 (e.g., an unaesthetically pleasing building). In addition, the algorithms may include background detection algorithms that detect/determine the background (e.g., sky, water, mountains, etc.) depicted within a particular frame. Accordingly, the remote computing resources 108 may identify picturesque scenes that would serve as good candidates for the video segments and/or the video summarization.

The algorithms may also determine the quality of the frames of the video data 120. For instance, one or more visual saliency algorithms may determine the contrast associated with frames. For instance, the visual saliency algorithms may identify objects that have a high degree of contrast as compared to other objects depicted in the frame (e.g., a pink flamingo standing on green grass). Other image quality algorithms may determine she sharpness of the frames, such as by determining whether any blur exists within the frames, as well as determining the color (e.g., color detection algorithms) and saturation associated with the frames. Any distortions or other defects associated with the frames may also be detected, such as frames, or the horizon depicted within the frames, being uneven or crooked.

In additional embodiments, the algorithms may include motion detection algorithms to determine whether any objects are moving within the frames of the video data 120. The user 104 may be interested in images depicting a person running or otherwise moving. The algorithms may also include pose and/or gesture detection algorithms that detect various poses of individuals depicted within the frames, or that detect gestures performed by the individuals. Such poses/gestures may include an individual jumping, waving, giving a "thumbs up," making a "peace sign," and so on. A determination that frames include individuals looking towards the camera 114 and performing some action may increase user interest in such frames.

As stated above, interest levels or values may be assigned to different frames of the video data 120, where the interest levels/values are based on the objects, individuals, scenes, etc., depicted within the frames. The objects/features/content depicted within the frames may contribute to the interest levels/values that are attributed to those frames. For instance, detection/identification of a face depicted in a frame may correspond to a first value representing a first level of interest, detection of motion depicted in a frame may correspond to a second value representing a second level of interest, detection of a particular scene depicted in a frame may correspond to a third value that represents a third level of interest, and so on. In addition, the interest levels/values of the frames of the video data 120 may be illustrated as a curve that includes a data point for each frame of the video data 120. Using the curve, the video segment determination module 308 may determine which frames are the best candidates for the video segments that will make up the video summarization(s) of the video data 120. In certain embodiments, frames of the video data 120 that are selected to be included in the video segments may those that have associated interest values that are above a threshold value, or at least have interest values that are greater than the interest values assigned to other frames of the video data 120.

As will be discussed in additional detail herein, the video segment determination module 308 may select frames of the video data 120 to include in the video segments based on the corresponding interest values for the frames. In some embodiments, the frames may be selected based on the first summarization parameters 130. That is, the first summarization parameters 130 may indicate certain types of content (e.g., persons, objects, scenes, motion, etc.) that the user 104 would like to be included in the first video summarization 134, and frames of the video data 120 that depict that content may be selected as a result. In order to identify frames that depict the content desired by the user 104, the algorithms that are used to identify the frames may be weighted or prioritized. For example, if the user 104 would like video segments having certain individuals, but indicates little to no preference regarding particular scenes to include in the first video summarization 134, the video segment determination module 308 may provide a greater weight to human/face detection algorithms as compared to scene detection algorithms. In other embodiments, the video segment determination module 308 may apply some, but not all, of the computer vision algorithms to the video data 120.

Before, after, or while the frames that depict interesting content are identified, the video summarization parameters module 310 may determine the first summarization parameters 130 that are used to generate the first video summarization 134. Instead of the video summarizations being automatically generated by the remote computing resources 108 without input from the user 104, the user 104 may be allowed to have stylistic control of, or at least be allowed to set constraints/rules for generation of video summarizations, the video summarization that is created from the video data 120. The user 104 may initially provide any type of input that may influence which frames of the video data 120 are selected to be included within the video segments that constitute the first video summarization 134 of the video data 120. That is, the frames of the video data 120 that are selected, and the resulting video segments that will make up the first video summarization 130, may be consistent with the first summarization parameters 130. Examples of the first summarization parameters 130 may include overall length, pace, entropy, and/or style (e.g., directorial style or technique) associated with the video summarization. A more detailed description of the first summarization parameters 130 is set forth below with respect to FIG. 4.

From the video segments identified by the video segment determination module 308, the video summarization module 312 may generate a video summarization, such as the first video summarization 134, from the video data 120. For the purposes of this discussion, a video summarization may constitute a condensed version, or a summary, of a video (e.g., the video data 120). The video summarization may include one or more video segments or clips that depict different content that is also depicted in the original video. For instance, for a video that captures a child's birthday party, different video segments may depict the decorations prior to the birthday party, the guests arriving, the child opening his/her presents, the guests singing "happy birthday" to the child, the child blowing out candles on the cake, the children at the birthday playing with the gifts, and so on. The video segments of the video summarization may be presented consecutively, such that the user 104 may view all of the video segments of the video summarization. Alternatively, or in addition, the user 104 may select which video segments of the video summarization to view/play. As a result, by viewing the video segments of the video summarization, a user 104 may view a summary of the important or interesting events that were captured in the original video.

In various embodiments, the video summarization (e.g., the first video summarization 134) may be generated by selecting, extracting, and/or parsing particular frames of the video data 120, and then combining the frames into a video segment. This process may performed multiple times in order to generate multiple video segments, which may constitute the video summarization. The length, content, style, etc., of the first video summarization 134 may be based on the first summarization parameters 130. Moreover, selection of which video segments are to be included in the first video summarization 134 may be performed by the video segment similarity module 314 and/or the video segment ranking module 316.

The video segment similarity module 314 may determine the similarity between video segments determined (e.g., identified, generated, etc.) by the video segment determination module 308. The similarity of video segments may be based on the content (e.g., persons, objects, scenes, etc.) depicted within the frames included within the video segments. Video segments that are deemed to be similar, such as video segments that depict the same persons, the same scene, etc., may be grouped, clustered, or categorized into one or more groups, clusters, or categories. That is, video segments included within the same group may be deemed to be similar in some way. Using the birthday party example set forth above, different video segments of the video that captured the birthday party may be similar in different respects. For instance, video segments that depict the same person(s) may be deemed similar, while different video segments that depict the same scene or event (e.g., opening gifts, eating birthday cake, etc.) may also be considered to be similar.

The video segment ranking module 316 may rank the video segments. More particularly, the video segment ranking module 316 may rank the video segments based on the likelihood that the video segments depict content that is to be of interest to the user 104, which may be based on the first summarization parameters 130. The manner in which the video segments are ranked may also be based on the interest values assigned to frames of the video data 120. For instance, video segments that include one or more frames that have greater interest values may be ranked higher than video segments that include one or more frames that have lesser interest values. In embodiments where the video segments are ranked based on the interest values of frames of the video data 120, a video segment may be ranked based on an average of interest values of the frames included within the video segment, the interest value of a frame included within the video segment having the highest interest value, the interest value of a frame included within the video segment that has the lowest interest value, and so on. In additional embodiments, the video segments may be ranked based on their respective similarity to a particular style/technique associated with a director (e.g., directorial style) and/or a film/movie.

In some embodiments, each video segment associated with the video data 120 may be ranked with respect to one another. This way, when generating the video summarization (e.g., the first video summarization 134), the video summarization module 312 may select the highest ranked video segments to be included in the video summarization. As a result, the video summarization module 312 may ensure that the video summarization includes video segments that depict content that is most likely to be of interest to the user 104. Since multiple different high ranking video segments may include the same, or at least similar, persons, objects, scenes, etc., the video summarization may include video segments that depict similar content. That is, the video summarization may include redundant or duplicative video segments. Using the birthday party example, the video summarization may include video segments relating to the child opening gifts, the singing of "happy birthday," the child blowing out the candles, and so on. Each of these events may be depicted in multiple, different video segments. Therefore, the highest ranking video segments that are included in the video summarization may include the same events, thus resulting in the video summarization mostly including video segments that correspond to these same events (e.g., the child opening gifts, the singing of "happy birthday," the child blowing out the candles, etc.).

Moreover, the video segments within each group or cluster may be ranked with respect to one another. Then, when generating the video summarization, the video summarization module 312 may select one or more video segments from each of the groups/clusters. For instance, using the birthday party example, assume that the video segments were grouped by (1) the guests arriving, (2) singing "happy birthday," (3) the child blowing out the candles, (4) the child opening gifts, and (5) children playing with the gifts. To generate the video summarization, the video summarization module 312 may select one more of the highest ranked video segments from each of the above categories. That way, the video summarization will include video segments that depict a variety of content (e.g., persons, objects, scenes, events, etc.) depicted within the original video.

Upon generating the first video summarization 134, the video summarization module 312 may send the first video summarization 134 to the user 104. In particular, the first video summarization 134 may be provided to the user 104 via a website, an application associated with the video capture device 102 and/or the remote computing resources 108, an e-mail message, a text message, or in any other manner. The user 104 may then access and play the first video summarization 134 via a user device 106 associated with the user 104. In some embodiments, the user 104 may be satisfied with the first video summarization 134. However, in other embodiments, the user 104 may dislike the first video summarization 134, may want modifications made to the first video summarization 134, and/or may want the video data 120 to be re-summarized in order to generate a new video summarization of the video data 120. The user feedback module 318 may receive data that represents user feedback associated with the user 104, and the data may constitute the second summarization parameters 136 that are used to generate the second video summarization 138.

The data representative of the user feedback associated with the user 104 may represent generalized feedback or may be more granular in nature. For instance, the user 104 may generally state that he/she does not like the first video summarization 134. More specifically, the user 104 may state that he/she does not like certain video segments included in the first video summarization 134 and would like them replaced with other video segments as a result. Further still, the user 104 may request specific modifications to the first video summarization 134, such as requesting that that the color, length, camera angle, etc., for one or more video segments be modified. That is, the user 104 may provide any type of input relating to the first video summarization 134, which may be used by the user device 106 to generate data representative of user feedback of the user 104.

Based at least partly on the data representative of the user feedback, the remote computing resources 108 may generate the second summarization parameters 136. The video re-summarization module 320 may then re-summarize the video data 120 using the second summarization parameters 138 to generate the second video summarization 138. The second video summarization 138 may include a modified version of the video segments included in the first video summarization 134. Alternatively, the second video summarization 138 may include different video segments, as compared to the first video summarization 134. The second video summarization 138 may then be provided to the user device 106 that provided the data representative of the user feedback, or any other user device 106.

FIGS. 4-8 are flow diagrams of illustrative processes for generating video summarizations from video data based at least partly on summarization parameters provided by users. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
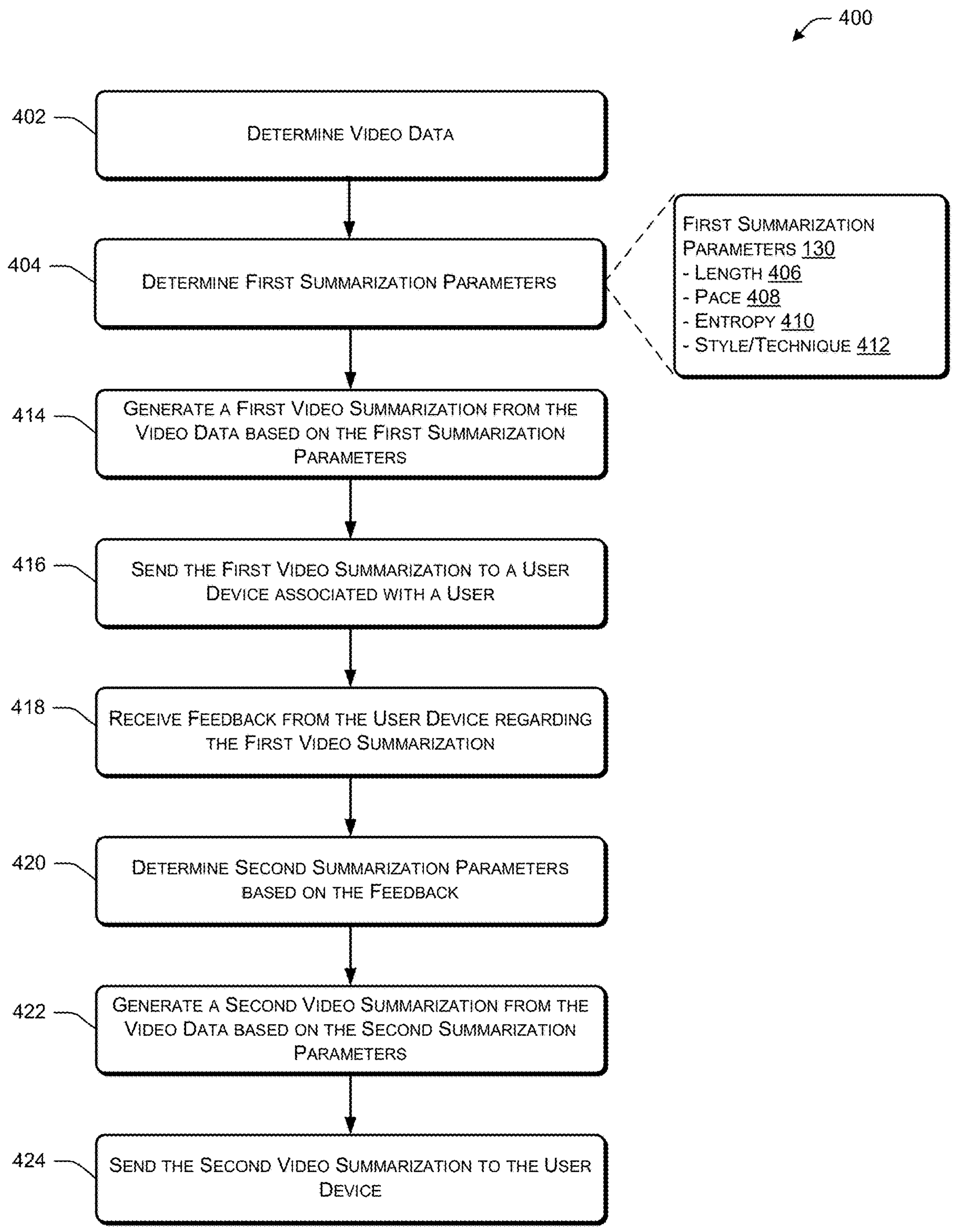
FIG. 4 is a flow diagram illustrating an example process of generating one or more video summarizations based on video summarization parameters associated with a user.

FIG. 4 is a flow diagram illustrating an example process 400 of generating multiple video summarizations from video data based on summarization parameters provided by a user. Moreover, the following actions described with respect to FIG. 4 may be performed by the video capture device 102 and/or the remote computing resource(s) 108, as illustrated in, and described with respect to, FIGS. 1-3.

Block 402 illustrates determining video data. In particular, the one or more cameras 114 of the video capture device 102 may capture the video data 120 and provide the video data 120 to the remote computing resources 108 for processing. However, the process 400 illustrated in FIG. 4 may be performed with respect to any type of video data 120 (e.g., a video that is viewable by a user 104).

Block 404 illustrates determining first summarization parameters. The first summarization parameters 130 may be default parameters determined by the remote computing resources 108, parameters provided by a user 104, parameters inferred based on behavior, data representative of prior user feedback, interests, etc., associated with the user 104. In various embodiments, the first summarization parameters 130 may be used by the remote computing resources to generate a video summarization of the video data 120 (e.g., the first video summarization 134). As illustrated in FIG. 4, the first summarization parameters 134 may include at least length 406, pace 408, entropy 410, and style/technique 412 (i.e., directorial style).

In some embodiments, the length 406 may correspond to the overall length of a video summarization. For instance, the user 104 may indicate that he/she would like the entire video summarization to be shorter in length (e.g., two minutes) or longer in length (e.g., thirty minutes). The overall length of the video summarization may be varied based on the number of video segments included in the video summarization (e.g., more video segments may result in a longer duration of the video summarization) and/or the length of the individual video segments included in the video summarization (e.g., longer video segments may result in a longer video summarization). The video summarization module 312 may vary the overall length of the video summarization based on the number and/or length of video segments included in the video summarization. Moreover, as discussed below, the number and/or length of the video segments included in the video summarization may be dependent upon the particular style 412 preferred by the user 104.

The pace 408 parameter may correspond to the video segment length, such as the average video segment length, of the video segments that make up the first video summarization 134. Since the pace 408 corresponds to the length of video segments, the pace may vary. For instance, a faster pace for the first video summarization 134 may include more video segments that are shorter in duration, while a slower pace for the first video summarization 134 may include a greater number of video segments that are shorter in duration. The user 104 may request that the first video summarization 134 include a greater amount, but shorter, video segments or a lesser amount, but longer video segments. Alternatively the user 104 may request a larger number of video segments of greater duration or fewer video segments of a lesser duration.

The first summarization parameters 130 may also include entropy 410, which may correspond to a variation in the length 406, the pace 408, or any other summarization parameter that may be used to generate video summarizations. For instance, the variation may be with respect to the content depicted in the video segments, the camera angle, sound (e.g., a soundtrack, music, other sound effects) that is audibly output in conjunction with the video segments, panning speed (e.g., faster/slower panning, more/less movement of the camera 114 capturing the video data 120, etc.), the presence of dialogue and/or variation in the type/style of the dialogue, locations/positions at which objects/persons are located within the video segments (possibly invoking the rules of thirds), color, filters applied to the video segments, and so on.

Moreover, style/technique 412 may correspond the style and/or technique in which the video segments and the entire video summarization is created. For instance, the user 104 may indicate that he/she would like the video summarization to be in the style 412 of a particular director or movie. As a result, the remote computing resources 108 may generate the video summarization in that particular style 412. To do so, the remote computing resources 108 may apply particular parameters to the video data 120 in order to generate video segments that are consistent with the specified style 412.

In order to generate video summarizations in a particular directorial style 412 of video that may be requested by the user 104, the remote computing resources 108 may first determine various traits or characteristics associated with different directorial styles 412 of videos. Then, when the user 104 requests that a video summarization from a video be created in a particular directorial style 412, the remote computing resources 108 may determine the traits/characteristics associated with that directorial style 412 and apply those traits/characteristics to the video data 120. Examples of different traits or characteristics that may be associated with one or more directorial styles 412 may include the length 406 of the video summarization and/or the video segments, the pace 408, the entropy 410, the manner in which the video data 120 was/is framed, filters applied to the video data 120, audio (e.g., a soundtrack, music, dialogue, etc.) associated with the video summarization, the order in which the video segments of the video summarization are presented (e.g., chronological, random, reverse chronological, etc.), rotation of the frames within the video segments, the exposure associated with the frames, multiple frames/video segments playing simultaneously, graphical elements such as text (e.g., "in a land far, far away") or visual objects (e.g., balloons moving across the video) depicted in the video segments, and so on.

For instance, assume that a particular director of films/movies typically includes scenes that are short in duration, include erratic camera movement, and that include background music. The user 104 may request that a video summarization be generated from a video, and that the video summarization be in the style of that particular director. As a result, the remote computing resources 108 may select video segments that are shorter in duration, process the video segments so that they appear as if the camera that captured the video was moving erratically, and audibly present background music in conjunction with the video summarization.

Block 414 illustrates generating a first video summarization from the video data based on the first summarization parameters. As stated above, based on the first summarization parameters, the remote computing resources 108 may identify and/or generate video segments of the video data 120 that include frames that depict content that is likely to be of interest to the user 104.

Block 416 illustrates sending the first video summarization to a user device associated with the user. In particular, upon generating the first video summarization 134, the remote computing resources 108 may provide the first video summarization 134 to the user 104. The user 104 may then play the first video summarization 134 and/or the video segments that make up the first video summarization 134. As described above, the first video summarization 134 may represent a summary or a condensed version of the video data 120.

Block 418 illustrates receiving feedback from the user device regarding the first video summarization. As stated above, the user 104 may provide input regarding a given video summarization, such as the user 114 indicating that he/she does not like some or all of the video summarization. As a result of receiving the input, the user device 106 may generate data that is representative of the user feedback. The data may be provided by the user device 106 to the remote computing resources 108, which may use the data to re-summarize the video data 120 in order to generate a new video summarization.

The feedback that corresponds to the data can take many different forms and can vary in granularity. For instance, the user 104 may specify that he/she does or does not generally like the first video summarization 134, which may be indicated by a thumbs up/down, actuating a like/dislike button, and so on. Alternatively, or in addition, the user 104 may express their approval/disapproval of particular portions of the first video summarization 134, such as individual video segments that constitute the first video summarization 134. Even further, the user 104 may express disapproval of various characteristics (e.g., color, camera angle, length/number of video segments, etc.) associated with the first video summarization 134.

In addition to explicit feedback, the feedback may be implicit/inferred as well. For example, using one or more sensors, cameras (video or still image), microphones, etc., the remote computing resources 108 may determine user behavior of the use 104 while viewing the first video summarization 134. That is, the user's 104 facial expressions, eye gaze, gestures, body language, audible utterances (e.g., words, a sigh, etc.), physiological characteristics (e.g., heart rate, body temperature, etc.), etc., may indicate that the user 104 does or does not like some or all of the first video summarization 134. As a result, the remote computing resources 108 may determine that the user 104 would like the first video summarization 134 modified in some manner (e.g., change the style, the length/number of the video segments, etc.), and/or would like certain video segments to be modified, replaced, and/or removed from the first video summarization 134.

Block 420 illustrates determining second summarization parameters based on the feedback. Based on the data that is representative of the user feedback associated with the user 104, the remote computing resources 108 may determine second summarization parameters 136 that may be used to re-summarize the video data 120 to generate the second video summarization 138.

Moreover, the data representative of the user feedback may be used by the remote computing resources 108 to improve algorithms used to generate the video summarizations and/or to customize the video summarizations that are generated and delivered to a particular user 104. The remote computing resources 108 may use one or more machine learning techniques (e.g., supervised learning, unsupervised learning, semi-supervised learning, regression analysis, clustering, classification, etc.) to determine characteristics of previously generated video summarizations and analyze data that represents user feedback relating to such video summarizations. That is, over time the remote computing resources 108 may use machine learning techniques to determine which characteristics (e.g., length 406, pace 408, entropy 410, style technique 412, etc.) were preferred by users 104, or at least little to no negative feedback was not received relating to such characteristics, and which characteristics were not well received by users 104. The remote computing resources 108 may then generate video summarizations based on generalized preferences, or specific preferences relating to a user 104, learned over time. To do so, the remote computing resources 108 may modify algorithms used to generate the video summarizations from video data 120, such as by determining or modifying weights or variables associated with such algorithms.

For instance, the remote computing resources 108 may identify characteristics of video summarizations and/or video segments (e.g., video segment length 406, color, audio, video panning, etc.) that were generated and provided to users 104. Such characteristics may be input into a feature vector. The remote computing resources 108 may determine which video summarizations were received well and poorly, and can determine how those video summarizations correlated with the feature vector. This may be done generally across all users 104 in which video summarizations were generated, or specifically for an individual user 104. As a result, the remote computing resources 108 may customize video summarizations for a particular user 104 based on their specific feedback/preferences as the user 104 provides input that is used to generate first video summarizations 134 and provides additional input that is used by the user device 106 to generate data that represents user feedback relating to such first video summarizations 134.

The video summarizations generated and provided to a user 104 may also be based on interests/preferences of the user 104, as well as the interests/preferences of other users 104 that are deemed to have similar traits, interests, preferences, and/or characteristics. For instance, using clustering techniques, the remote computing resources 108 may cluster or group users 104 based on how they have rated video summarizations and the input they have provided regarding such video summarizations. Then, when generating a video summarization for a particular user 104, such as a user 104 that has yet to request a video summarization, the remote computing resources 108 may categorize that user 104 into a particular group/cluster based on their traits, interests, preferences, characteristics, etc. Since users 104 within a particular group/cluster are deemed to be similar in some manner, the video summarization that is generated for that user 104 may be consistent with the interests/preferences of other users 104 within that group/cluster.

In some embodiments, the remote computing resources 108 and/or users 104 may determines styles/techniques 412 for video summarizations, may modify existing styles/techniques 412, and/or may merge different styles/techniques 412. For instance, a particular style/technique 412 may correspond to weddings, birthdays, and so on. The machine learning techniques described herein may learn characteristics of those styles/techniques 412 over time and generate specific summarization parameters and/or rules to subsequently generate video summarizations based on the styles/techniques 412.

Block 422 illustrates generating a second video summarization from the video data based on the second summarization parameters. In particular, the remote computing resources 108 may re-summarize the video data 120, or may modify the first video summarization 134, to generate the second video summarization 138. For example, if the user 104 did not like a first style/technique 412 associated with the first video summarization 134, the remote computing resources 108 may re-summarize the video data 120 to generate the second video summarization 138 in a second, different style/technique 412. The second style/technique 412 may be specifically requested by the user 104, such as the user 104 identifying a specific style/technique 412 associated with a particular director and/or film/movie. If the user 104 did not provide input about a preferred style/technique 412, the remote computing resources 108 may re-summarize the video data 120, a new style/technique 412 may be selected for the second video summarization 138.

The user 104 may indicate that he/she would like modifications to the first video summarization 134, such as the user 104 indicating that he/she would like one or more video segments added, removed, or replaced. In this scenario, the remote computing resources 108 may re-summarize the video data 120 to adjust the video segments that are included in the second video summarization 138. The user 104 may also indicate that he/she would more, fewer, or no video segments depicting a certain person, object, scene, etc. The remote computing resources 108 may use one or more algorithms (e.g., human detection, face detection, object detection, scene detection, etc.) to identify video segments/frames of the video data 120 that do or do not depict such persons, objects, scenes, etc. Provided that certain persons, objects, scenes, etc., depicted in the video data 108 could be identified, the remote computing resources 108 may assign identifiers to those persons, objects, scenes, etc. Then, using the identifiers, the remote computing resources 108 may select video segments/frames to include in the second video summarization 138 based on whether such persons, objects, scenes, etc., are depicted in the video segments/frames of the video data 120.

In addition, the second video summarization 138 may be generated by selecting video segments not included in the first video summarization 134, such as by selecting one or more video segments that are prior to, or subsequent in time to, the video segments that the user 104 would like modified or replaced. The remote computing resources 108 may also randomly select different video segments associated with the video data 120. Further still, the remote computing resources 108 may re-summarize the video data 120 to generate multiple, different video summarizations, and then send some or all of the video summarizations to the user 104. The user 104 may then have the option of selecting at least one of the multiple video summarizations, or providing additional input regarding those video summarizations, where the user device 106 may utilize the input to generate data representative of user feedback relating to the video summarizations.

Block 424 illustrates sending the second video summarization to the user device. Upon receiving the second video summarization 138, the user 104 may have the option to again provide input, which may result in the user device generating data representative of user feedback relating to the second video summarization 138 and which may result in the remote computing resources 108 generating and providing one or more additional video summarizations of the video data 120 to the user 104.

Figure 5:
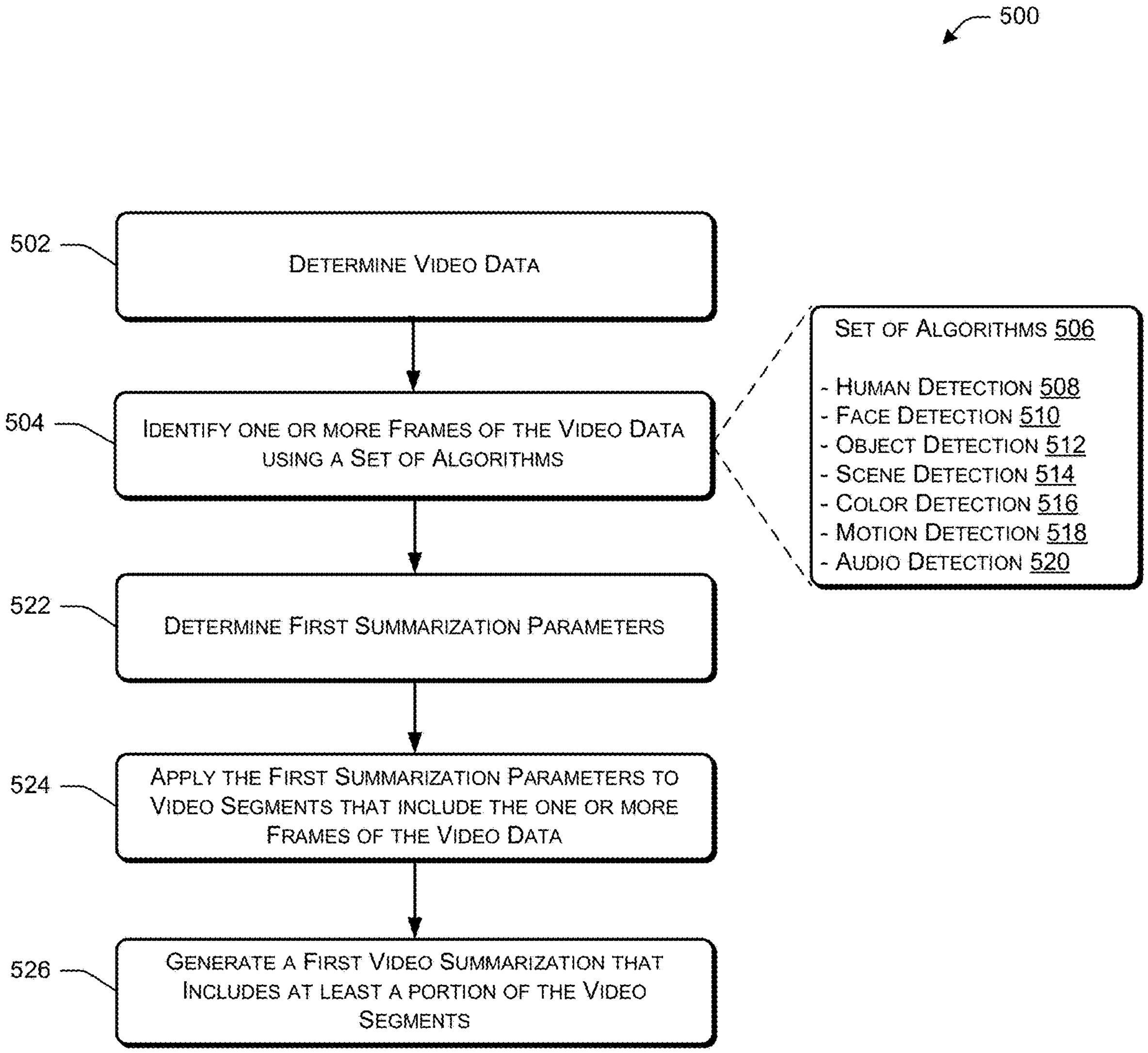
FIG. 5 is a flow diagram illustrating an example process of generating a video summarization from video data based on one or more vision detection algorithms.

FIG. 5 is a flow diagram illustrating an example process 500 of generating a video summarization from video data. Moreover, the following actions described with respect to FIG. 5 may be performed by the video capture device 102 and/or the remote computing resource(s) 108, as illustrated in, and described with respect to, FIGS. 1-3.

Block 502 illustrates determining video data. In particular, the one or more cameras 114 of the video capture device 102 may capture the video data 120 and provide the video data 120 to the remote computing resources 108 for processing. However, the process 500 illustrated in FIG. 5 may be performed with respect to any type of video data 120

(e.g., a video that is viewable by a user 104), such as video data 120 generated by the remote computing resources 108 and/or video data 120 that is received or obtained from another source.

Block 504 illustrates identifying one or more frames of the video data using a set of algorithms. In various embodiments, the remote computing resources may utilize one or more algorithms of a set of algorithms 506 (e.g., computer vision algorithms) to identify frames of the video data 120 that depict content (e.g., persons, objects, scenes, etc.) that are likely to be of interest to a user 104. Such algorithms 506 may include human detection algorithms 508 that detect persons within a frame of the video data 120 (e.g., Haar cascades algorithm, histogram of oriented gradients (HOG) algorithm, etc.), face detection algorithms 510 (e.g., viola Jones object detection, or variations thereof, etc.) that detect and/or identify faces, object detection algorithms 512 that detect and/or identify objects depicted in the frames of the video data 120 (e.g., Haar cascades algorithm, HOG algorithm, viola-jones object detection, etc.), scene detection algorithms 514 that detect particular scenes (e.g., a beach scene, a city scene, a mountain scene, etc.) (e.g., temporal graph analysis algorithm, etc.), color detection algorithms 516 that detect color, or lack thereof (e.g., YCbCr color space algorithm, etc.), motion detection algorithms 518 that detect motion of persons or objects within frames of the video data 120 (e.g., bulk, middle mass, optical flow, etc.), and audio detection algorithms 520 that detect audio corresponding to a user 104 of the video capture device 102 (e.g., a voice command) and/or audio corresponding to the ambient environment surrounding the video capture device 102 (e.g., other voices, waves crashing, a vehicle, other background noise, etc.) (e.g., pitch detection algorithm, etc.).

Block 522 illustrates determining first summarization parameters. The first summarization parameters 130 may be default parameters determined by the remote computing resources, inferred parameters, and/or input provided by users 104 that specifies the preferences/interests regarding a subsequently generated video summarization.

Block 524 illustrates applying the first summarization parameters to video segments that include the one or more frames of the video data. The remote computing resources 108 may determine video segments of the video data 120 that include frames of the video data 120 that are determined to depict content that is likely to be of interest to the user 104. Once the video segments are determined, the first summarization parameters 130 are applied to the video segments in order to generate a video summarization that is consistent with the preferences/interests of the user 104.

Block 526 illustrates generating a first video summarization that includes at least a portion of the video segments. Using the first summarization parameters 130, the remote computing resources 108 may generate the first video summarization 134, which may include one or more video segments of the video data 120. The first video summarization 134 may represent a condensed version or a summary of the original video processed by the remote computing resources 108.

Figure 6:
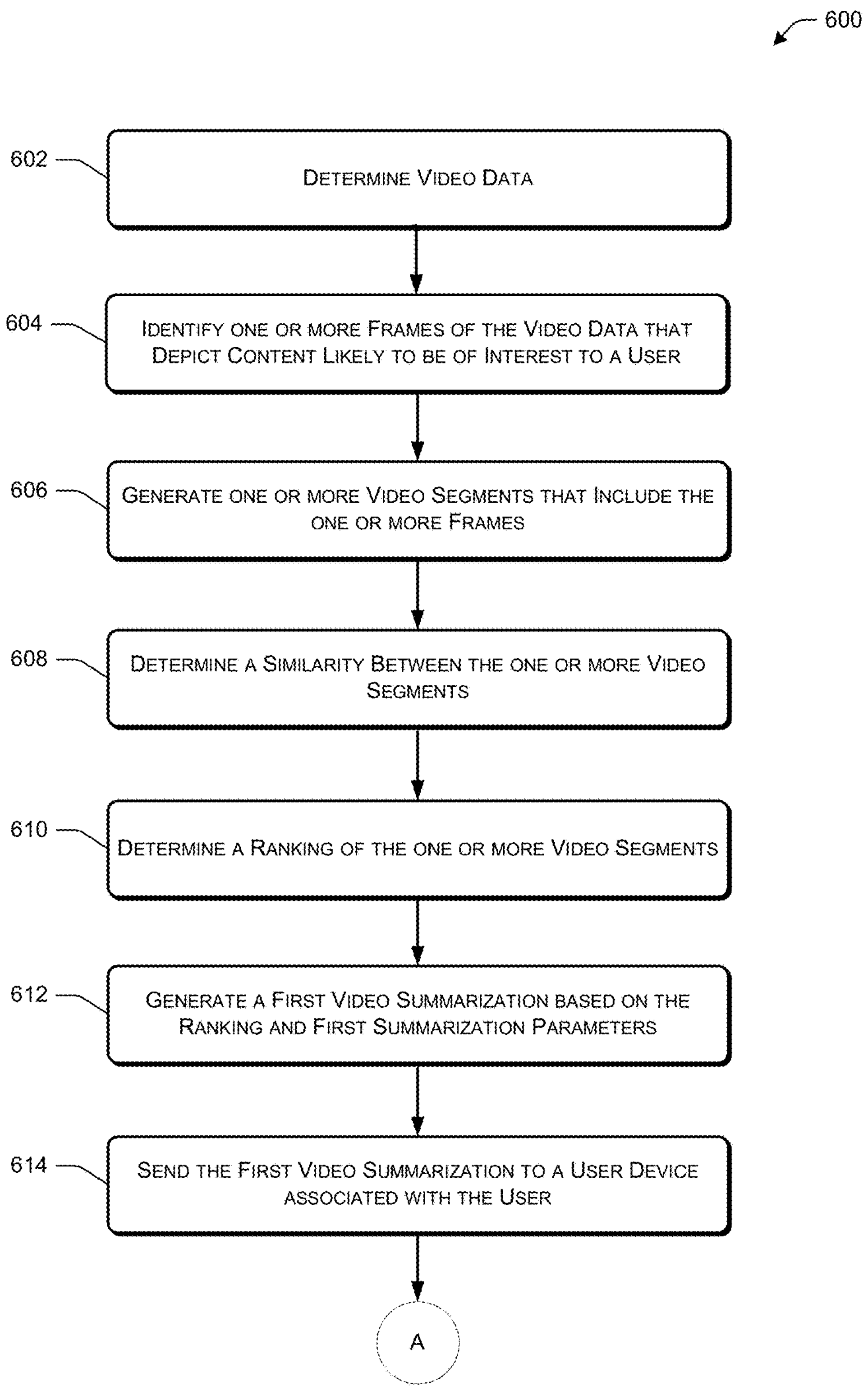
FIG. 6 is a flow diagram illustrating an example process of generating a video summarization from video data based on a similarity and ranking of frames of the video data.

FIG. 6 is a flow diagram illustrating an example process 600 of generating a first video summarization from video data based on summarization parameters. Moreover, the following actions described with respect to FIG. 6 may be performed by the video capture device 102 and/or the remote computing resource(s) 108, as illustrated in, and described with respect to, FIGS. 1-3.

Block 602 illustrates determining video data. In certain embodiments, the one or more cameras 114 of the video capture device 102 may capture the video data 120 and provide the video data 120 to the remote computing resources 108 for processing. However, the process 400 illustrated in FIG. 4 may be performed with respect to any type of video data 120 (e.g., a video that is viewable by a user 104).

Block 604 illustrates identifying one or more frames of the video data that depict content likely to be of interest to a user. As stated above, the remote computing resources 108 may identify and select one or more frames within the video data 120 that have the highest interest level/values, or that have relatively high interest levels/values, which may indicate that those frames depict content that is most likely to be of interest to the user 104. In other embodiments, provided that a first frame is associated with a first interest level/value that is greater than a second interest level/value associated with a second frame, the first frame may be selected over the second frame. Moreover, the remote computing resources 108 may select one or more frames that have corresponding interest levels/values that are above a threshold value.

Provided that the remote computing resources 108 determine or generate a curve that indicates the interest level/scores for the frames of the video data 120, the one or more local maxima associated with the curve may be identified. For the purposes of this discussion, local maxima may be referred to greater values associated with the curve that are within a given neighborhood or range, which may correspond to the data points representing frames of the video data 120. The local maxima residing on the curve, which may be shown as a peak or rise on the curve, may indicate data points representing frames of the video data 120 having a greater interest level/value. Local maxima illustrated on the curve may indicate frames of the video data 120 that are promising candidates to include within the video segments that are to be included in a video summarization. For instance, the local maxima may represent frames that depict certain individuals, scenes, objects, etc., that the user 104 would likely want depicted in the video summarization.

In some embodiments, the interest values for various frames of the video data 120 may be plotted on a graph (or some other medium) based on their relative numerical values, and the curve may be generated based on these relative values. More particularly, the curve may be generated by determining a line or curve that intersects, or at least comes in close proximity to, each of the interest values that are representative of the multiple frames of the video data 120. Accordingly, the curve may identify candidate frames of the video data 120 that could possibly be selected to be used to generate the video summarizations. For the purposes of this discussion, the curve may be of any shape or form, and may be dependent upon the particular interest values associated with the candidate frames.

Moreover, in some embodiments, the systems and processes described within may select one or more frames to include in video segments of the video summarization based on the curve. More particularly, the remote computing resources 108 may identify one or more local maxima associated with the curve, where the one or more local maxima correspond to frames having the highest, or higher, interest values. Since a higher interest value associated with a frame may indicate that the frame depicts content (e.g., individuals, objects, scenes, etc.) that is likely to be of interest to the user 104, the remote computing resources 108 may identify the local maxima associated with the curve in order to select one or more frames from the previously identified candidate frames. The selected frames may be located at a higher position on the curve than the other interest values associated with different frames of the video data 120. Provided that multiple frames of the video data 120 are to be included in video segments that will make up the video summarization, the remote computing resources 108 may identify multiple local maxima associated with the curve.

Block 606 illustrates generating one or more video segments that include the one or more frames. The video segments may represent a portion of the video data 120 that depicts content that is likely to be of interest to the user 104. As a result, each video segment may include multiple frames of the video data 120.

Block 610 illustrates determining a ranking of the one or more video segments. Each of the video segments may be ranked with respect to one another based on a number of factors, such as a likelihood that content depicted within the video segments are likely to be of interest to the user 104, summarization parameters provided by the user 104, inferred preferences of the user 104, and so on. Moreover, similar video segments included within a group or cluster may be ranked with respect to one another.

Block 612 illustrates generating a first video summarization based on the ranking and first summarization parameters. For instance, the remote computing resources 108 may select video segments for the first video summarization 134 such that interesting portions of the original video are included in the first video summarization 134. Using the birthday party example described above, the remote computing resources 108 may want to ensure that at least one video segment of the first video summarization 134 captures decorations for the birthday party, guests arriving for the birthday party, singing of "happy birthday," the child blowing out the candles, the child opening gifts, and/or children playing with the gifts.

Block 614 illustrates sending the first video summarization to a user device associated with the user. Upon generating the first video summarization 134, the remote computing resources 108 may send the first video summarization 134 to the user 104 for viewing and providing input relating to the first video summarization 134.

Figure 7:
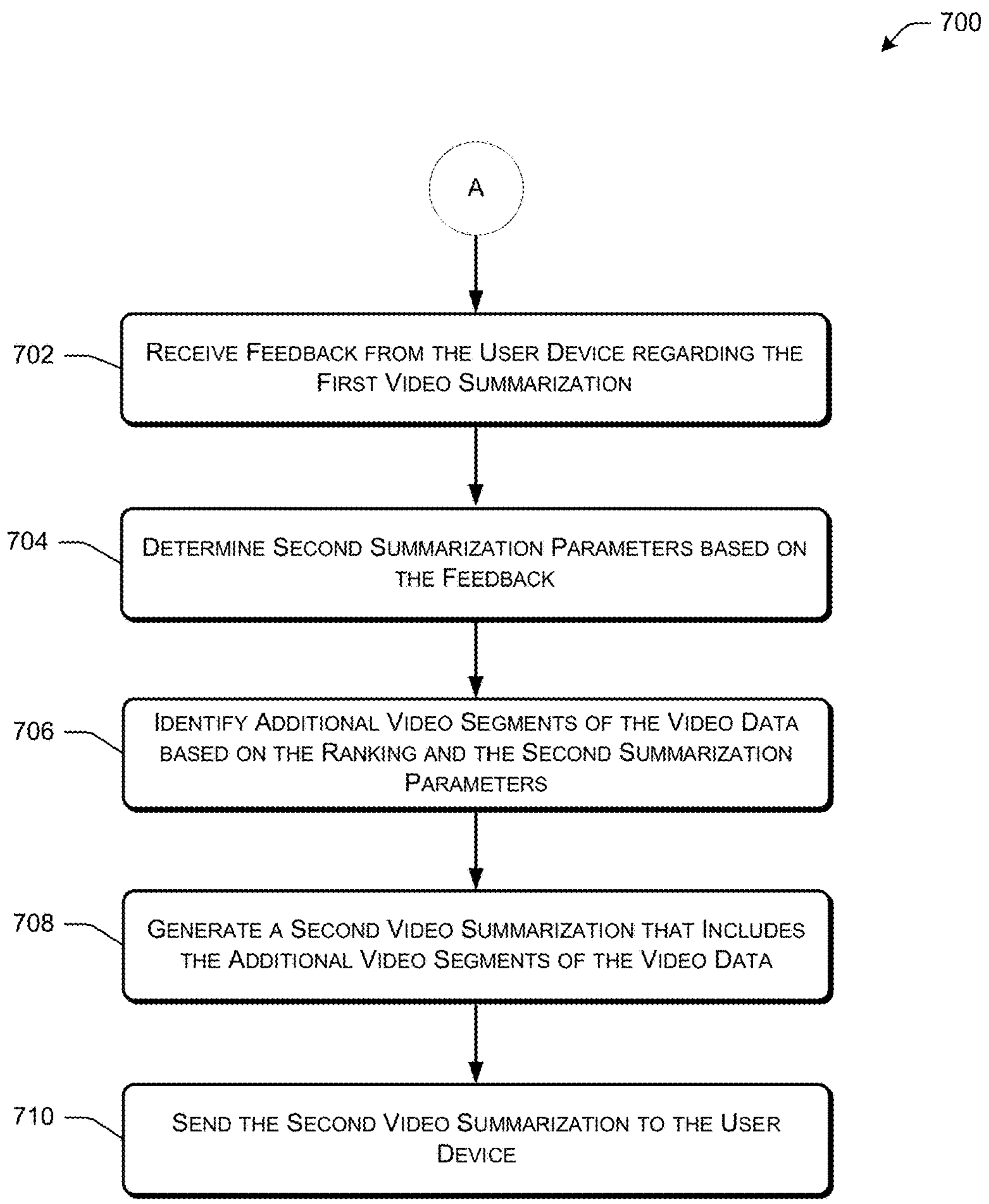
FIG. 7 is a flow diagram illustrating an example process of generating an additional video summarization from video data based on additional frames of the video data.

FIG. 7 is a flow diagram illustrating an example process 700 of generating a second video summarization based on feedback relating to the first video summarization illustrated in FIG. 6. Moreover, the following actions described with respect to FIG. 7 may be performed by the video capture device 102 and/or the remote computing resource(s) 108, as illustrated in, and described with respect to, FIGS. 1-3.

Block 702 illustrates receiving feedback from the user device regarding the first video summarization. Continuing from the flow diagram illustrated in FIG. 6, the user 104 may provide input relating to the first video summarization 134 generated from the video data 120. The user device 106 associated with the user 104 may generate data that represents user feedback relating to the first video summarization, and may send the data to the remote computing resources 108. The remote computing resources 108, at block 704, may determine second summarization parameters based on the feedback. That is, the remote computing resources 108 may use the data to generate the second summarization parameters 136. The second summarization parameters 136 may be used to generate a second video summarization 138 from the video data 120.

Block 706 illustrates identifying additional video segments of the video data based on the ranking and the second summarization parameters. As stated above, an entirety of the previously determined video segments, or a portion of the video segments (e.g., video segments included in a group or cluster), may be ranked. Therefore, when the user 104 requests a new video summarization, the remote computing resources 108 may select the next highest ranked video segments to include in the second video summarization 138. That is, additional video segments, such as the next highest ranked video segments, may replace certain video segments included in the first video summarization 134. The next highest ranking video segments may also be added to form the second video summarization 138, such that the second video summarization 138 includes the video segments included in the first video summarization 134 plus additional vide segments not previously included in the first video summarization 134.

In some embodiments, the video segments included in the first video summarization 134 and the additional ranked video segments not included in the first video summarization 134 may be presented to the user 104. Some of the additional ranked video segments may share characteristics that are common or similar to the video segments included in the first video summarization. For instance, the similar characteristics may relate to similarity in composition, motion of objects, motion of the camera that captured the video data 120, audio (e.g., music), chronology/order, and so on. As a result, the user 104 may select which video segments he/she would like to include within the second video summarization 138. In some embodiments, the user 104 may elect to replace a video segment with a different video segment that includes similar, but different, characteristics. The user 104 may also elect to include additional video segments that depict content (e.g., persons, objects, scenes, events, etc.) that were not depicted in, or that are similar to video segments included in, the first video summarization 134. Thus, if the user 104 liked a particular video segment included in the first video summarization, the user 104 may select other similar video segments for inclusion in the second video summarization 138. Accordingly, the user 104 may customize the content of the second video summarization 138 with the assistance of the remote computing resources 108 grouping/clustering and ranking the video segments of the video data 120.

Block 708 illustrates generating a second video summarization that includes the additional video segments of the video data. Based on the second summarization parameters 136 and/or the ranking of the video segments, the remote computing resources may generate an additional video summarization (i.e., the second video summarization 138) from the original video data 120.

Block 710 illustrates sending the second video summarization to the user device. Upon receiving the second video summarization 138, the user 104 may have the option of again providing input regarding the second video summarization 138.

Figure 8:
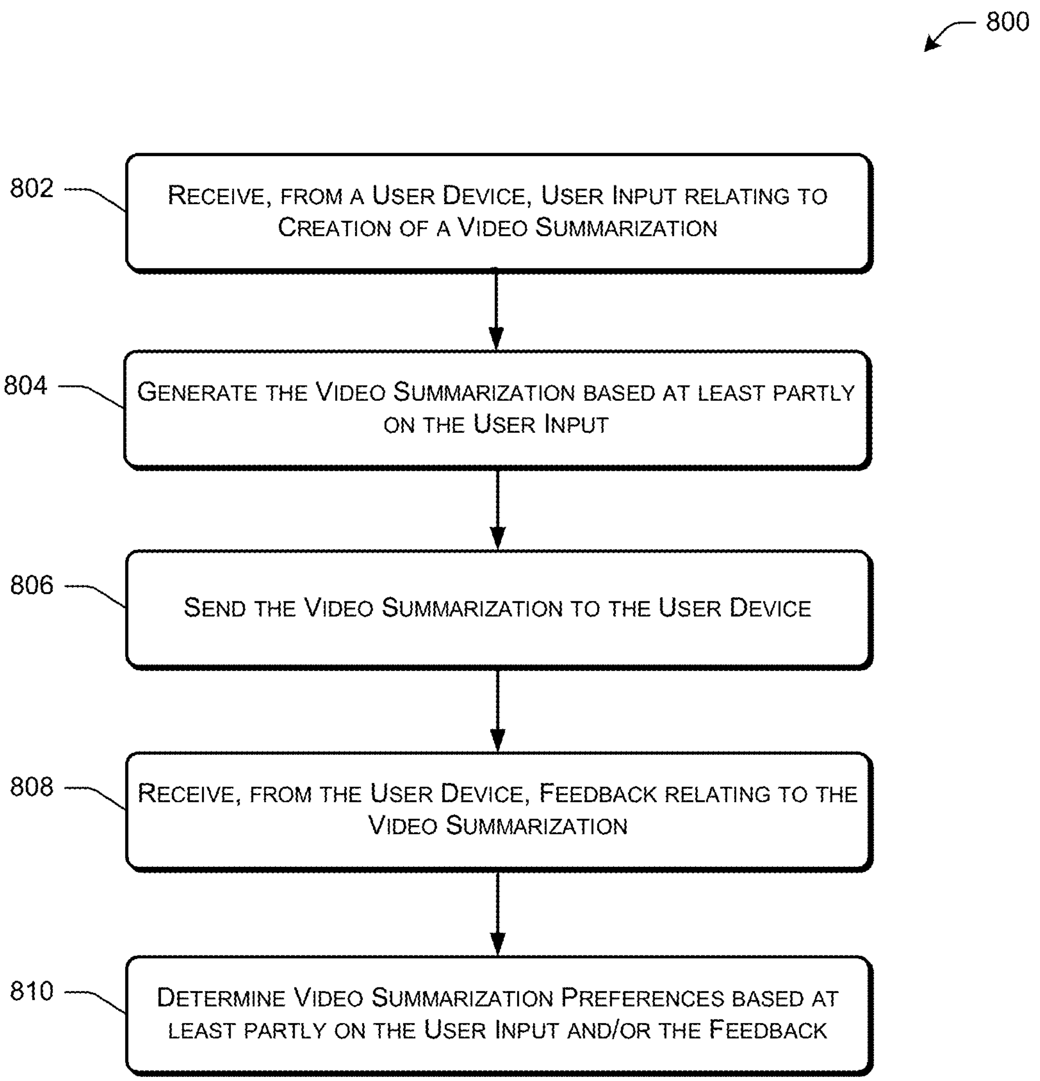
FIG. 8 is a flow diagram illustrating an example process of determining video summarization preferences based on user input and feedback relating to a video summarization.

FIG. 8 is a flow diagram illustrating an example process 800 of determining video summarization preferences based on user input and feedback relating to a video summarization. Moreover, the following actions described with respect to FIG. 8 may be performed by the video capture device 102 and/or the remote computing resource(s) 108, as illustrated in, and described with respect to, FIGS. 1-3.

Block 802 illustrates receiving, from a user device, user input relating to creation of a video summarization. In particular, the user 104 may specific one or more preferences (e.g., the first video summarization parameters 130) that indicate preferences for the creation of a video summarization (e.g., the first video summarization 134). As set forth above, the preferences may relate to at least one of the length 406, the pace 408, the entropy 410, or the style/technique 412 relating to the video summarization. In other embodiments, the user input may not be received from the user 104 and may be based on information/data known about the user 104, such as information associated with a user account or user profile associated with the user 104. Such information may include preferences/interests of the user 104, and/or items (e.g., products, services, etc.) that the user 104 searched for, browsed to, and/or purchased, possibly via a website associated with the remote computing resources 108.

Block 804 illustrates generating the video summarization based at least partly on the user input. That is, in view of the first video summarization parameters 130, the remote computing resources 108 may generate the first video summarization 134, which may include one or more video segments that each include one or more frames of the video data 120.

Block 806 illustrates sending the video summarization to the user device. Following creation of the first video summarization 134, the remote computing resources 108 may provide the first video summarization 134 to the user device 106 associated with the user 104 in any manner (e.g., an e-mail message, a website, an application associated with the user device 106, a text message, and so on).

Block 808 illustrates receiving, from the user device, feedback relating to the video summarization. In various embodiments, the user 104 may provide input relating to any aspect of the first video summarization 134. For instance, the user 104 may indicate that they do not like the entire video summarization, that he/she dislikes certain video segments included in the video summarization, that the video summarization should be in a different directorial style, and so on. Based on the input, the user device 106 may generate data that is representative of user feedback relating to the video summarization and may send the data to the remote computing resources 108.

Block 810 illustrates determining video summarization preferences based at least partly on the user input and/or the feedback. Based on the initial input provided by users 104 and/or the data generated by the user device 106 (either general in nature or specific) relating to the video summarization, the remote computing resources 108 may determine and/or learn preferences of a particular user 104 and/or a population of users 104 with respect to video summarizations. In particular, one or more machine learning techniques may be utilized to determine preferences relating to directorial styles that the user/users 104 liked/disliked, the ideal length of video summarizations and/or associated video segments, etc. The remote computing resources 108 may utilize the video summarization preferences when generating subsequent video summarizations for the user 104 and/or other users 104. In some embodiments, various algorithms used to generate the video summarizations from the video data 120 may be created, adjusted, modified, removed, etc., based on the user input and/or the data that is representative of the user feedback.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

memory;

one or more processors; and one or more computer-executable instructions stored in the memory and executable by the one or more processors to perform operations comprising:

receiving video data generated by a camera of a user device;

determining first summarization parameters based on data associated with a user account, the data including at least one of a search history of items searched for via a website, a browse history of items viewed via the website, or a purchase history of items purchased via the website;

generating a first video summarization of the video data based on the first summarization parameters, wherein generating the first video summarization comprises:

generating a first video segment that includes a first frame of the video data and that is of a first duration that is less than a total duration of the video data;

generating a second video segment that includes a second frame of the video data that is of a second duration that is less than the total duration of the video data; and generating at least one of the first video segment or the second video segment based on a first directorial style associated with the first summarization parameters;

receiving, from the user device, a request to modify the first video summarization;

determining, based on the request, second summarization parameters that are different than the first summarization parameters, wherein the second summarization parameters are based at least partly on:

identifying one or more prior video summarizations previously generated in association with the user account; and determining a second directorial style different than the first directorial style and associated with the one or more prior video summarizations;

generating a second video summarization of the video data based on the second summarization parameters, the second video summarization being different than the first video summarization; and sending the second video summarization to the user device.

2. The system as recited in claim 1, wherein the operations further comprise determining the first frame of the video data and the second frame of the video data by:

determining a curve that includes multiple data points that comprise a first data point that is representative of a first interest value assigned to the first frame and a second data point that is representative of a second interest value assigned to the second frame;

determining that the first data point constitutes a first local maxima of the curve;

determining that the second data point constitutes a second local maxima of the curve;

selecting the first frame based on the first data point constituting the first local maxima of the curve; and selecting the second frame based on the second data point constituting the second local maxima of the curve.

3. The system as recited in claim 1, wherein the operations further comprise:

determining that a third frame of the video data depicts a first scene;

generating a third video segment that includes the third frame and that is of a third duration that is less than the total duration of the video data;

determining that a fourth frame of the video data depicts a second scene;

generating a fourth video segment that includes the fourth frame and is of a fourth duration that is less than the total duration of the video data;

determining, based on a first interest value assigned to the third frame and a second interest value assigned to the fourth frame, that the third video segment is assigned a higher ranking than the fourth video segment; and determining, based on the second summarization parameters, that the third video segment is to be included in the second video summarization.

4. The system as recited claim 1, wherein the operations further comprise:

determining that a third frame of the video data depicts a first scene;

generating a third video segment that includes the second frame and is of a third duration that is less than the total duration of the video data;

determining that a similarity between the second video segment and the third video segment is above a threshold value; and determining, based on the second summarization parameters, that the third video segment is to be included in the second video summarization.

5. The system as recited in claim 1, wherein the operations further comprise:

determining that the purchase history indicates that an item of the items was purchased in association with the user account; and generating the first video summarization in a particular directorial style that is associated with a category of items that includes the item.

6. A method comprising:

determining multiple video segments associated with video data, wherein determining the multiple video segments associated with the video data comprises determining a first video segment of the multiple video segments that is associated with at least one frame of the video data and that has a duration that is less than a total duration of the video data;

determining one or more summarization parameters based at least partly on a user account and prior to generating a video summarization of the video data, wherein determining the one or more summarization parameters includes:

identifying one or more prior video summarizations previously generated in association with the user account; and determining one or more characteristics of a directorial style associated with the user account; and generating, based at least partly on the one or more summarization parameters, the video summarization.

7. The method as recited in claim 6, further comprising:

assigning an interest value to a frame of the video data based at least partly on at least one of a person or a scene depicted in the frame;

determining that the interest value is above a threshold value;

determining a video segment of the multiple video segments, wherein determining the video segment comprises determining that the video segment includes the frame; and selecting the video segment to be included in the video summarization.

8. The method as recited in claim 6, further comprising:

determining that the first video segment includes a first frame of the video data that depicts first content;

determining a second video segment of the multiple video segments, wherein determining the second video segment comprises determining that the second video segment includes a second frame of the video data that depicts second content;

assigning a first rank to the first video segment based at least partly on the first content;

assigning a second rank to the second video segment based at least partly on the second content;

determining that the first rank is greater than the second rank; and selecting the first video segment to be included in the video summarization.

9. The method as recited in claim 6, further comprising determining that the video summarization includes at least the first video segment and a second video segment of the multiple video segments, wherein determining that the video summarization includes the at least the first video segment and the second video segment comprises determining that the first video segment includes one or more first frames of the video data that depicts first content and that the second video segment includes one or more second frames of the video data that depict second content.

10. The method as recited in claim 6, further comprising:

determining that the first video segment includes a first frame of the video data that depicts first content;

determining a second video segment of the multiple video segments, wherein determining the second video segment comprises determining that the second video segment includes a second frame of the video data that depicts second content;

determining that a similarity between the first content and the second content is greater than a threshold value;

associating the first video segment and the second video segment with a category;

ranking the first video segment, the second video segment, and additional video segments of the multiple video segments within the category;

determining that a first ranking assigned to the first video segment is greater than a second ranking assigned to the second video segment; and selecting the first video segment to be included in the video summarization.

11. The method as recited in claim 10, further comprising:

receiving, from a user device associated with the user account, data representative of a request to at least one of modify or replace the first video segment;

selecting the second video segment to be included in a second video summarization of the video data; and sending, to the user device, the second video summarization.

12. The method as recited in claim 6, further comprising;

receiving, from a user device associated with the user account, data representative of a request to at least one of modify or replace the video summarization, the video summarization including at least a first video segment of the multiple video segments;

determining one or more second summarization parameters, including a second directorial style that is different than the directorial style, based at least partly on the data;

generating, based at least partly on the one or more second summarization parameters, a second video segment of the multiple video segments to be included in a second video summarization of the video data; and sending, to the user device, the second video summarization.

13. The method as recited in claim 6, further comprising determining that the one or more summarization parameters are based at least partly on at least one of input received from a user associated with the user account, default parameters, prior behavior exhibited by the user, information associated with the user account, or prior behavior exhibited by other users.

14. The method as recited in claim 6, further comprising receiving, from a user device associated with the user account, data representative of feedback relating to the video summarization, wherein the receiving the data includes at least one of:

receiving an indication of approval or disapproval of an entirety of the video summarization;

receiving an indication of approval or disapproval of one or more video segments included in the video summarization;

receiving a request to modify, remove, or replace one or more video segments included in the video summarization; or receiving a request to add one or more video segments of the multiple video segments to the video summarization.

15. A system comprising:

memory;

one or more processors; and one or more computer-executable instructions stored in the memory and executable by the one or more processors to perform operations comprising:

determining that a first frame of video data depicts first content, wherein determining that the first frame of the video data depicts the first content comprises determining that the first content includes at least one of a person, an object, or a scene;

determining one or more first summarization parameters based at least partly on one or more prior video summarizations previously generated in association with a user account, the one or more first summarization parameters including a first directorial style;

generating a first video segment that includes the first frame and is of a first duration that is less than a total duration of the video data;

generating a first video summarization of the video data that includes the first video segment based at least partly on the one or more first summarization parameters, the one or more first summarization parameters including a first directorial style; and sending, to a user device, the first video summarization.

16. The system as recited in claim 15, wherein the operations further comprise:

receiving, from the user device, data representative of a request to modify the first video summarization;

generating, based at least partly on the data, one or more second summarization parameters that are different than the first summarization parameters, the one or more second summarization parameters including a second directorial style that is different than the first directorial style;

determining that a second frame of the video data depicts second content;

generating a second video segment that includes the second frame and is of a second duration that is less than the total duration of the video data;

selecting, based at least partly on the one or more second summarization parameters, the second video segment; and generating, based at least partly on the one or more second summarization parameters and the second video segment, a second video summarization.

17. The system as recited in claim 16, wherein the request to modify the first video summarization includes at least one of:

an additional video segment from the video data but not included in the first video summarization to be added, the additional video segment corresponding to the second frame of the video data;

at least one video segment included in the first video summarization be removed or replaced; or content depicted in the at least one video segment be modified.

18. The system as recited in claim 15, wherein the operations further comprise:

determining that a second frame of the video data depicts second content;

determining that a third frame of the video data depicts third content;

determining a second video segment that includes the second frame;

determining a third video segment that includes the third frame;

assigning a first rank to the second video segment based at least partly on the second content;

assigning a second rank to the third video segment based at least partly on the third content;

determining that the first rank is greater than the second rank; and selecting the second video segment to be included in the first video summarization.

19. The system as recited in claim 18, wherein the operations further comprise determining that the one or more first summarization parameters include, in addition to the first directorial style, at least one of a preferred duration of the first video summarization, a preferred duration of video segments included within the first video summarization, or an acceptable level of entropy among at least the first video segment and the second video segment.

20. The system as recited in claim 15, wherein the operations further comprise:

assigning an interest value to the first frame based at least partly on the first content;

determining that the interest value is above a threshold value; and selecting the first video segment to be included in the first video summarization.

* * * * *